(12) United States Patent
Ueda

(10) Patent No.: US 7,061,982 B2
(45) Date of Patent: Jun. 13, 2006

(54) LONG-HOUR VIDEO/AUDIO COMPRESSION DEVICE AND METHOD THEREOF

(75) Inventor: Hiroaki Ueda, Tokyo (JP)

(73) Assignee: NEC Corporation, Tokyo (JP)

(*) Notice: Subject to any disclaimer, the term of this patent is extended or adjusted under 35 U.S.C. 154(b) by 670 days.

(21) Appl. No.: 09/950,789

(22) Filed: Sep. 13, 2001

(65) Prior Publication Data

US 2002/0044609 A1    Apr. 18, 2002

(30) Foreign Application Priority Data

Sep. 13, 2000    (JP)    ............................. 2000-277413

(51) Int. Cl.
*H04N 7/18* (2006.01)

(52) U.S. Cl. .............................. 375/240.25; 375/240.26

(58) Field of Classification Search ............................... 375/240.25–240.29
See application file for complete search history.

(56) References Cited

U.S. PATENT DOCUMENTS 5,508,816 A * 4/1996 Ueda et al. ................. 386/101
5,619,197 A * 4/1997 Nakamura ..................... 341/50
5,671,226 A * 9/1997 Murakami et al. .......... 370/474
6,236,805 B1 * 5/2001 Sebestyen ..................... 386/98
6,584,125 B1 * 6/2003 Katto .......................... 370/537
6,744,975 B1 * 6/2004 Kimura ........................ 386/98

FOREIGN PATENT DOCUMENTS

| JP | H9-326777 A | 12/1997 |
| JP | 10-79671 | 3/1998 |
| JP | H11-176083 A | 7/1999 |
| JP | 2000-125257 | 4/2000 |
| JP | 2001-238169 A | 8/2001 |
| JP | 2002-77919 A | 3/2002 |

* cited by examiner

*Primary Examiner*—Andy Rao
(74) *Attorney, Agent, or Firm*—Sughrue Mion, PLLC

(57) ABSTRACT

An application receives an original video and an original audio from a capture or a file to transfer the same to an interface control unit and writes a system code generated by the interface control unit into a system code file. The interface control unit controls a video compression control unit, an audio compression control unit and a system coding control unit of a compression/coding unit to store generated codes in a video buffer, an audio buffer and a system buffer and transfer the codes to the application.

25 Claims, 22 Drawing Sheets

FIG. 6
(a) AUDIO SEQUENCE 
(b) AAU 
• DATA SUCH AS
SYNCHRONOUS WORD,
BIT RATE AND
SAMPLING FREQUENCY

FIG.20
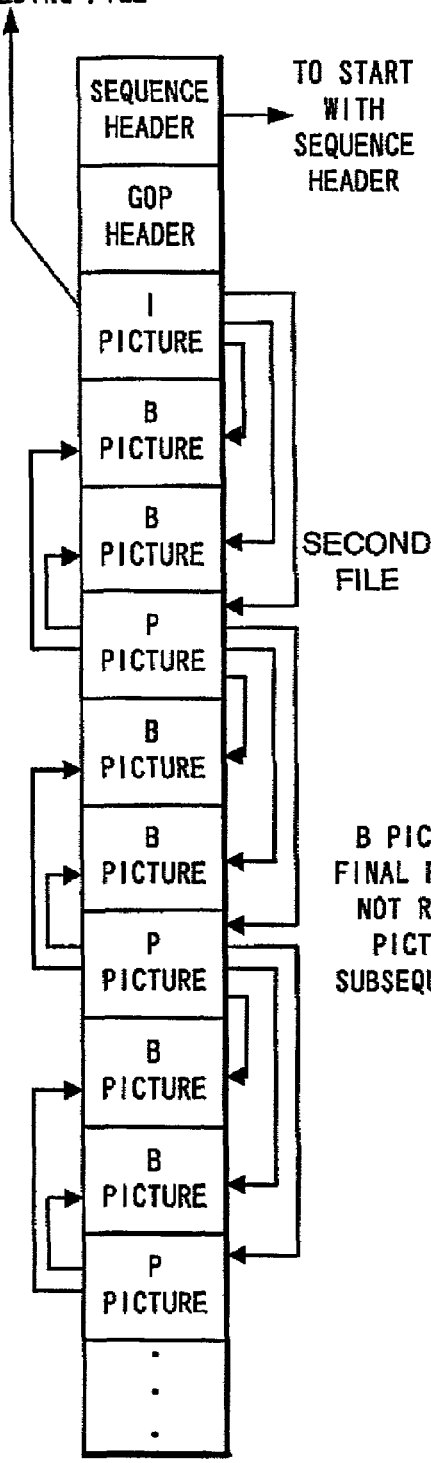
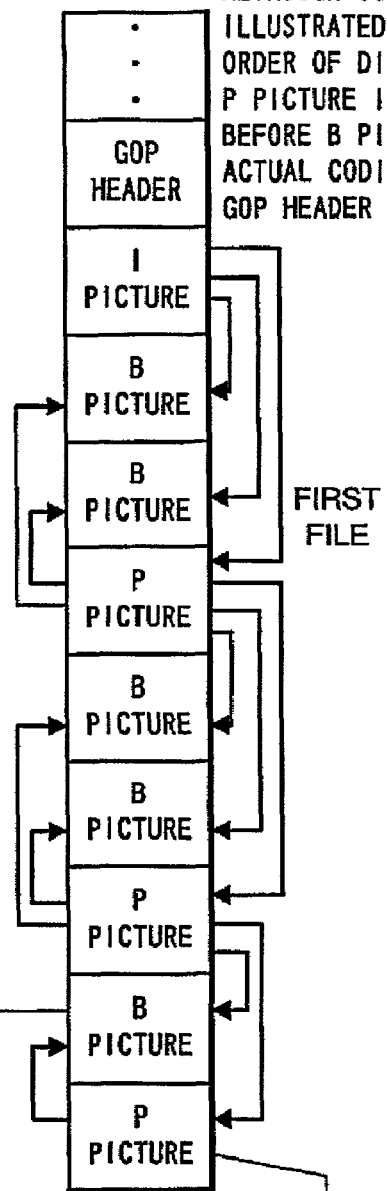

LONG-HOUR VIDEO/AUDIO COMPRESSION DEVICE AND METHOD THEREOF

BACKGROUND OF THE INVENTION

1. Field of the Invention

The present invention relates to a long-hour video/audio compression device and a method thereof and, more particularly, to a compression and coding method for compressing and coding video and audio.

2. Description of the Related Art

In a case of digitization of videos and audio for the recording on a recording medium such as a CD-ROM or a hard disc, because the volume of their data is ordinarily enormous, the video and the audio are recorded after being subjected to compression and coding. Control for compression and coding and recording of videos and audio of this kind is realized by executing an application program.

As this compression and coding method, various kinds of compression and coding systems exist, among which relatively more often used is the coding system based on DCT (Discrete Cosine Transform) for conducting compression making the use of the nature that space frequencies of videos concentrate on low frequencies. The system is adopted as an international standard coding system such as the JPEG (Joint Photographic Expert Group), the MPEG (Moving Picture Expert Group) 1 or the MPEG 2.

In the following, conventional compression operation will be described with respect to the MPEG. First, structure of a video compression control unit is shown in FIG. 2. In FIG. 2, a video compression control unit 40 includes a YUV conversion unit 41 for converting an image to have a format of a color signal [YUV format: format in which a color signal is separated into a luminance signal (Y) and a color difference signal (Cb, Cr)] compressible by the MPEG, a motion searching unit 42 for searching each region of a block (16 pixels×16 pixels in MPEG) for motion of images in preceding/succeeding frames and a current frame, a DCT unit 43 for converting an image of a block into a space frequency, a quantization unit 44 for conducting quantization, an inverse quantization unit 47 for conducting inverse quantization for the restoration from quantization, an inverse DCT unit 46 for the restoration from frequency conversion, a motion compensating unit 45 for compensating for motion of an image on a block basis to generate a new reference frame and a variable-length coding unit 48 for conducting variable-length coding.

Image compression processing by the video compression control unit 40, as shown in FIG. 2, is realized by converting an original image from a capture or a file into YUV data by the YUV conversion unit 41 to conduct compression according to a kind of picture. In a case of an I picture [intra-coded picture (intra-frame coded frame)], YUV data is divided into blocks, converted into a space frequency on a block basis by the DCT unit 43 and quantized by the quantization unit 44, and then variable-length coded by the variable-length coding unit 48 to output a compressed code. In addition, a quantized block is inversely quantized by the inverse quantization unit 47 and inversely frequency-converted by the inverse DCT unit 46 to generate a reference frame.

In a case of a P picture [predictive-coded picture (inter-frame coded frame)], YUV data is divided into blocks to obtain a block having the highest correlation among blocks of a preceding frame stored as a reference frame by the motion searching unit 42 on a block basis and a difference from the block of the preceding frame having the highest correlation is converted into a space frequency by the DCT unit 43, quantized by the quantization unit 44 and then variable-length coded by the variable-length coding unit 48 to output a compressed code. In addition, a quantized block is inversely quantized by the inverse quantization unit 47, inversely frequency-converted by the inverse DCT unit 46 and then added to a block whose motion is compensated for by the motion compensating unit 45 to generate a reference frame.

In a case of a B picture [bidirectionally predictive-coded picture (intra-frame inserted coded frame)], YUV data is divided into blocks to obtain a block having the highest correlation among blocks of preceding/succeeding frames stored as a reference frame by the motion searching unit 42 on a block basis and a difference from the block of the preceding/succeeding frames having the highest correlation is converted into a space frequency by the DCT unit 43, quantized by the quantization unit 44 and then variable-length coded by the variable-length coding unit 48 to output a compressed code. In the case of a B picture, generation of a reference frame is unnecessary.

Next, structure of an audio compression control unit for conducting audio compression is shown in FIG. 3. In FIG. 3, an audio compression control unit 50 includes an original sound cut out unit 51 for cutting out original sound data of one AAU (Audio Access Unit) from an original sound, a 32 frequency bands mapping unit 52 for conducting frequency band mapping processing on an AAU basis, a quantization and coding unit 53 for conducting linear quantization and coding, a frame formation unit 54 for generating compressed data of one AAU by adding additional information to coded data and a psychological audition unit 55 for conducting psychological audition processing.

The audio compression processing by the audio compression control unit 50, as shown in FIG. 3, is realized by cutting out one AAU (1152 samples in a case of MPEG audio layer 2) from an original sound by the original sound cut out unit 51 and compressing the same on an AAU basis. The 32 frequency bands mapping unit 52 dissolves an input signal into sub band signals of 32 bands by a sub band analysis filter and calculates a scale factor of each sub band signal to equalize dynamic ranges.

The psychological audition unit 55 fast-Fourier-transforms an input signal and calculates a masking of psychological audition based on the conversion result to calculate bit assignment to each sub band. The quantization and coding unit 53 conducts quantization and coding according to the determined bit assignment. The frame formation unit 54 adds a header or subsidiary information to the quantized and coded sub band signal and shapes the signal into a bit stream to output the signal as a compressed code.

Shown in FIG. 4 is a structure of a system coding control unit for conducing system coding for multiplexing a video code and an audio code. In FIG. 4, a system coding control unit 60 includes a video pack generation unit 61 for packing a video code, an audio pack generation unit 62 for packing an audio code, a time stamp generation unit 63 for generating a time stamp to be inserted into a packet header and a padding pack generation unit 64 for generating a padding pack to be skipped by a decoder for the adjustment of a bit rate.

In system coding by the system coding control unit 60, as shown in FIG. 4, upon reception of a video code and an audio code, the unit 60 controls the video pack generation unit 61 and the audio pack generation unit 62 to output a system code. The video pack generation unit 61 cuts out data of a packet from the video code and adds a packet header and a pack header to the data. The audio pack generation unit 62 cuts out data of a packet from the audio code and adds a packet header and a pack header to the data.

At this time, in a case of a video code, when the head of a frame is contained in packet data, a PTS (Presentation Time Stamp) or a DTS (Decoding Time Stamp) generated at the time stamp generation unit 63 is inserted. In a case of an audio code, if the head of an AAU is contained in packet data, a PTS generated at the time stamp generation unit 63 is inserted. In addition, the padding pack generation unit 64 inserts a padding pack so as to have an average system bit rate.

Among such methods of compressing videos and audio as mentioned above is a method recited in Japanese Patent Laying-Open No. 2000-125257. In this method, compressed video/audio codes are written in a disk-type recording medium. Another method is recited in Japanese Patent Laying-Open No. 10-79671 which enables long-hour compression by changing a compression rate during recording operation.

While a volume of data can be reduced by compressing videos and audio as described above, when compression continues for hours even if a compression rate is high, the volume of data will become enormous. As a result, a system having an upper limit on a size of its producible file is not allowed to continue compression exceeding the upper limit when outputting a compressed code to a file.

Also even when reproducing only a part of a file compressed for hours by a reproduction device, one enormous file should be copied to cost labor.

Although only the solution of the above-described problems is dividing a compressed code into a plurality of files and outputting the same, simple division prevents a halfway file from becoming such an MPEG code as shown in FIGS. 5 to 7, so that reproduction is impossible by a standard reproduction device.

SUMMARY OF THE INVENTION

An object of the present invention is to provide a long-hour video/audio compression device capable of dividing an video code and a audio code with ease without the need of an application for checking the contents of an video code, a audio code and a system code and a method thereof.

Another object of the present invention is to provide a long-hour video/audio compression device enabling each of divided files to be singly reproduced by a standard reproduction device and a method thereof.

A further object of the present invention is to provide a long-hour video/audio compression device enabling reproduction by a standard reproduction device by combining divided files into one by an application and a method thereof.

According to the first aspect of the invention, a long-hour video/audio compression device for conducting long-hour recording on a system whose producible file size is limited and for conducting control of compression and coding and recording of videos and audio by the execution of an application program, comprises a division unit for dividing an MPEG (Moving Picture Expert Group) code on any of the bases of the amount of codes, the number of frames and time designated by the application program.

In the preferred construction, the division unit divides the MPEG code so as to start with a pack of a system code obtained by multiplexing a video code which is obtained by coding the video and an audio code which is obtained by coding the audio.

In another preferred construction, the division unit divides the MPEG code
such that the MPEG code starts with a pack of a system code obtained by multiplexing a video code which is obtained by coding the video and an audio code which is obtained by coding the audio, and
such that the video code starts with a sequence header, and such that the first pack has a system header.

In another preferred construction, the division unit divides the MPEG code
such that the MPEG code starts with a pack of a system code obtained by multiplexing a video code which is obtained by coding the video and an audio code which is obtained by coding the audio, and
such that the audio code starts with an AAU (Audio Access Unit) header containing information including at least a synchronous word, a bit rate and a sampling frequency.

In another preferred construction, the division unit divides the MPEG code
such that the MPEG code starts with a pack of a system code obtained by multiplexing a video code which is obtained by coding the video and an audio code which is obtained by coding the audio,
such that the video code starts with a sequence header, and such that the first pack has a system header, and
such that the audio code starts with an AAU (Audio Access Unit) header containing information including at least a synchronous word, a bit rate and a sampling frequency.

In another preferred construction, the division unit divides the MPEG code
such that the MPEG code starts with a pack of a system code obtained by multiplexing a video code which is obtained by coding the video and an audio code which is obtained by coding the audio, and
such that a time stamp indicative of a reproduction time of the video code and a time stamp indicative of a reproduction time of the audio code start at values as approximate to each other as possible.

In another preferred construction, the division unit divides the MPEG code
such that the MPEG code starts with a pack of a system code obtained by multiplexing a video code which is obtained by coding the video and an audio code which is obtained by coding the audio,
such that the video code starts with a sequence header, and such that the first pack has a system header, and
such that a time stamp indicative of a reproduction time of the video code and a time stamp indicative of a reproduction time of the audio code start at values as approximate to each other as possible.

In another preferred construction, the division unit divides the MPEG code
such that the MPEG code starts with a pack of a system code obtained by multiplexing a video code which is obtained by coding the video and an audio code which is obtained by coding the audio,
such that the audio code starts with an AAU (Audio Access Unit) header containing information including at least a synchronous word, a bit rate and a sampling frequency, and
such that a time stamp indicative of a reproduction time of the video code and a time stamp indicative of a reproduction time of the audio code start at values as approximate to each other as possible.

In another preferred construction, the division unit divides the MPEG code such that the MPEG code starts with a pack of a system code obtained by multiplexing a video code which is obtained by coding the video and an audio code which is obtained by coding the audio, such that the video code starts with a sequence header, and such that the first pack has a system header, such that the audio code starts with an AAU (Audio Access Unit) header containing information including at least a synchronous word, a bit rate and a sampling frequency, and such that a time stamp indicative of a reproduction time of the video code and a time stamp indicative of a reproduction time of the audio code start at values as approximate to each other as possible.

In another preferred construction, the division unit divides the MPEG code such that in the MPEG code, a B picture composed of inter-frame codes in both directions, forward and backward directions, needs not to be referred to over two files.

In another preferred construction, the division unit divides the MPEG code such that the MPEG code starts with a pack of a system code obtained by multiplexing a video code which is obtained by coding the video and an audio code which is obtained by coding the audio, and such that in the MPEG code, a B picture composed of inter-frame codes in both directions, forward and backward directions, needs not to be referred to over two files.

In another preferred construction, the division unit divides the MPEG code such that the MPEG code starts with a pack of a system code obtained by multiplexing a video code which is obtained by coding the video and an audio code which is obtained by coding the audio, such that the video code starts with a sequence header, and such that the first pack has a system header, and, such that in the MPEG code, a B picture composed of inter-frame codes in both directions, forward and backward directions, needs not to be referred to over two files.

In another preferred construction, the division unit divides the MPEG code such that the MPEG code starts with a pack of a system code obtained by multiplexing a video code which is obtained by coding the video and an audio code which is obtained by coding the audio, such that the audio code starts with an AAU (Audio Access Unit) header containing information including at least a synchronous word, a bit rate and a sampling frequency, and such that in the MPEG code, a B picture composed of inter-frame codes in both directions, forward and backward directions, needs not to be referred to over two files.

In another preferred construction, the division unit divides the MPEG code such that the MPEG code starts with a pack of a system code obtained by multiplexing a video code which is obtained by coding the video and an audio code which is obtained by coding the audio, such that the video code starts with a sequence header, and such that the first pack has a system header, such that the audio code starts with an AAU (Audio Access Unit) header containing information including at least a synchronous word, a bit rate and a sampling frequency, and such that in the MPEG code, a B picture composed of inter-frame codes in both directions, forward and backward directions, needs not to be referred to over two files.

In another preferred construction, the division unit divides the MPEG code such that the MPEG code starts with a pack of a system code obtained by multiplexing a video code which is obtained by coding the video and an audio code which is obtained by coding the audio, such that a time stamp indicative of a reproduction time of the video code and a time stamp indicative of a reproduction time of the audio code start at values as approximate to each other as possible, and such that in the MPEG code, a B picture composed of inter-frame codes in both directions, forward and backward directions, needs not to be referred to over two files.

In another preferred construction, the division unit divides the MPEG code such that the MPEG code starts with a pack of a system code obtained by multiplexing a video code which is obtained by coding the video and an audio code which is obtained by coding the audio, such that the video code starts with a sequence header, and such that the first pack has a system header, such that a time stamp indicative of a reproduction time of the video code and a time stamp indicative of a reproduction time of the audio code start at values as approximate to each other as possible, and such that in the MPEG code, a B picture composed of inter-frame codes in both directions, forward and backward directions, needs not to be referred to over two files.

In another preferred construction, the division unit divides the MPEG code such that the MPEG code starts with a pack of a system code obtained by multiplexing a video code which is obtained by coding the video and an audio code which is obtained by coding the audio, such that the audio code starts with an AAU (Audio Access Unit) header containing information including at least a synchronous word, a bit rate and a sampling frequency, such that a time stamp indicative of a reproduction time of the video code and a time stamp indicative of a reproduction time of the audio code start at values as approximate to each other as possible, and such that in the MPEG code, a B picture composed of inter-frame codes in both directions, forward and backward directions, needs not to be referred to over two files.

According to the second aspect of the invention, a long-hour video/audio compression method of conducting long-hour recording on a system whose producible file size is limited and conducting control of compression and coding and recording of videos and audio by the execution of an application program, comprising the step of dividing an MPEG (Moving Picture Expert Group) code on any of the bases of the amount of codes, the number of frames and time designated by the application program.

In the preferred construction, the MPEG code is divided so as to start with a pack of a system code obtained by multiplexing a video code which is obtained by coding the video and an audio code which is obtained by coding the audio.

In another preferred construction, the MPEG code is divided such that the MPEG code starts with a pack of a system code obtained by multiplexing a video code which is obtained by coding the video and an audio code which is obtained by coding the audio, and such that the video code starts with a sequence header, and such that the first pack has a system header.

In another preferred construction, the MPEG code is divided such that the MPEG code starts with a pack of a system code obtained by multiplexing a video code which is obtained by coding the video and an audio code which is obtained by coding the audio, and such that the audio code starts with an AAU (Audio Access Unit) header containing information including at least a synchronous word, a bit rate and a sampling frequency.

In another preferred construction, the MPEG code is divided such that the MPEG code starts with a pack of a system code obtained by multiplexing a video code which is obtained by coding the video and an audio code which is obtained by coding the audio, such that the video code starts with a sequence header, and such that the first pack has a system header, and such that the audio code starts with an AAU (Audio Access Unit) header containing information including at least a synchronous word, a bit rate and a sampling frequency.

In another preferred construction, the MPEG code is divided such that the MPEG code starts with a pack of a system code obtained by multiplexing a video code which is obtained by coding the video and an audio code which is obtained by coding the audio, and such that a time stamp indicative of a reproduction time of the video code and a time stamp indicative of a reproduction time of the audio code start at values as approximate to each other as possible.

In another preferred construction, the MPEG code is divided such that the MPEG code starts with a pack of a system code obtained by multiplexing a video code which is obtained by coding the video and an audio code which is obtained by coding the audio, such that the video code starts with a sequence header, and such that the first pack has a system header, and such that a time stamp indicative of a reproduction time of the video code and a time stamp indicative of a reproduction time of the audio code start at values as approximate to each other as possible.

In another preferred construction, the MPEG code is divided such that the MPEG code starts with a pack of a system code obtained by multiplexing a video code which is obtained by coding the video and an audio code which is obtained by coding the audio, such that the audio code starts with an AAU (Audio Access Unit) header containing information including at least a synchronous word, a bit rate and a sampling frequency, and such that a time stamp indicative of a reproduction time of the video code and a time stamp indicative of a reproduction time of the audio code start at values as approximate to each other as possible.

In another preferred construction, the MPEG code is divided such that the MPEG code starts with a pack of a system code obtained by multiplexing a video code which is obtained by coding the video and an audio code which is obtained by coding the audio, such that the video code starts with a sequence header, and such that the first pack has a system header, such that the audio code starts with an AAU (Audio Access Unit) header containing information including at least a synchronous word, a bit rate and a sampling frequency, and such that a time stamp indicative of a reproduction time of the video code and a time stamp indicative of a reproduction time of the audio code start at values as approximate to each other as possible.

In another preferred construction, the MPEG code is divided such that in the MPEG code, a B picture composed of inter-frame codes in both directions forward and backward directions, needs not to be referred to over two files.

In another preferred construction, the MPEG code is divided such that the MPEG code starts with a pack of a system code obtained by multiplexing a video code which is obtained by coding the video and an audio code which is obtained by coding the audio, and such that in the MPEG code, a B picture composed of inter-frame codes in both directions, forward and backward directions, needs not to be referred to over two files.

In another preferred construction, the MPEG code is divided such that the MPEG code starts with a pack of a system code obtained by multiplexing a video code which is obtained by coding the video and an audio code which is obtained by coding the audio, such that the video code starts with a sequence header, and such that the first pack has a system header, and such that in the MPEG code, a B picture composed of inter-frame codes in both directions, forward and backward directions, needs not to be referred to over two files.

In another preferred construction, the MPEG code is divided such that the MPEG code starts with a pack of a system code obtained by multiplexing a video code which is obtained by coding the video and an audio code which is obtained by coding the audio, such that the audio code starts with an AAU (Audio Access Unit) header containing information including at least a synchronous word, a bit rate and a sampling frequency, and such that in the MPEG code, a B picture composed of inter-frame codes in both directions, forward and backward directions, needs not to be referred to over two files.

In another preferred construction, the MPEG code is divided such that the MPEG code starts with a pack of a system code obtained by multiplexing a video code which is obtained by coding the video and an audio code which is obtained by coding the audio, such that the video code starts with a sequence header, and such that the first pack has a system header, such that the audio code starts with an AAU (Audio Access Unit) header containing information including at least a synchronous word, a bit rate and a sampling frequency, and such that in the MPEG code, a B picture composed of inter-frame codes in both directions, forward and backward directions, needs not to be referred to over two files.

In another preferred construction, the MPEG code is divided such that the MPEG code starts with a pack of a system code obtained by multiplexing a video code which is obtained by coding the video and an audio code which is obtained by coding the audio, such that a time stamp indicative of a reproduction time of the video code and a time stamp indicative of a reproduction time of the audio code start at values as approximate to each other as possible, and such that in the MPEG code, a B picture composed of inter-frame codes in both directions, forward and backward directions, needs not to be referred to over two files.

In another preferred construction, the MPEG code is divided such that the MPEG code starts with a pack of a system code obtained by multiplexing a video code which is obtained by coding the video and an audio code which is obtained by coding the audio, such that the video code starts with a sequence header, and such that the first pack has a system header, such that a time stamp indicative of a reproduction time of the video code and a time stamp indicative of a reproduction time of the audio code start at values as approximate to each other as possible, and such that in the MPEG code, a B picture composed of inter-frame codes in both directions, forward and backward directions, needs not to be referred to over two files.

In another preferred construction, the MPEG code is divided such that the MPEG code starts with a pack of a system code obtained by multiplexing a video code which is obtained by coding the video and an audio code which is obtained by coding the audio, such that the audio code starts with an AAU (Audio Access Unit) header containing information including at least a synchronous word, a bit rate and a sampling frequency, such that a time stamp indicative of a reproduction time of the video code and a time stamp indicative of a reproduction time of the audio code start at values as approximate to each other as possible, and such that in the MPEG code, a B picture composed of inter-frame codes in both directions, forward and backward directions, needs not to be referred to over two files.

According to another aspect of the invention, a long-hour video/audio compression program for conducting long-hour recording on a system whose producible file size is limited and for conducting control of compression and coding and recording of videos and audio by the execution of an application program by controlling a computer, comprising the function of dividing an MPEG (Moving Picture Expert Group) code on any of the bases of the amount of codes, the number of frames and time designated by the application program.

In other words, the video/audio compression device of the present invention is characterized in that such a structure is realized in which a compressed code can be output to a plurality of files divided on the basis of the amount of codes, on a frame basis or a time basis and furthermore each divided file can be singly reproduced at a standard reproduction device without minute control of compression by an application program (hereinafter, referred to as an application) for controlling compression and coding and recording of videos and audio for conducting long-hour recording on a system having an upper limit on a size of its producible file.

More specifically, in the video/audio compression device of the present invention, an application transfers a division unit on the basis of the amount of codes or on a frame basis, or a time basis to an interface control unit to make the interface control unit control compression operation. The application transfers an original video or an original audio from a capture or a file to the interface control unit to output a generated code to a file. Upon notification of generation of a code up to a division unit by the interface control unit to the application, the application outputs the generated code to another file.

By thus arranging such that control of compression and multiplexing of videos/audio concentrates on a coding control device to prevent an application from being directly concerned with compression and multiplexing processing, such system can be realized as enables division of video/audio codes with ease without the necessity of the application for checking the contents of video codes, audio codes and system codes.

In addition, in the above-described structure, each file starts with a pack header of a system code and the first pack has a system header and its video code starts with a sequence header and a B picture at the head can be decoded only by an I picture and a P picture in a GOP (Group of Picture) at the head, while an audio code of each file starts with an AAU (Audio Access Unit) header and each file is divided such that time stamps of the video code and the audio code start at values as approximate to each other as possible, so that each file becomes a completely independent MPEG code. As a result, each divided file can be singly reproduced by a standard reproduction device.

Furthermore, since each file is conformed to the MPEG standard and is singly reproducible, while time stamps indicative of a reproduction time are sequential, each file can be reproduced just by sequential reading of each file and transfer of the same to a decoder. As a result, combining the respective divided files into one by an application enables reproduction by a standard reproduction device.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 6 is a diagram showing arrangement of a code format conformed to MPEG audio;

FIG. 20 is a diagram showing an example of a code at the division of a video code in the embodiment of the present invention;

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
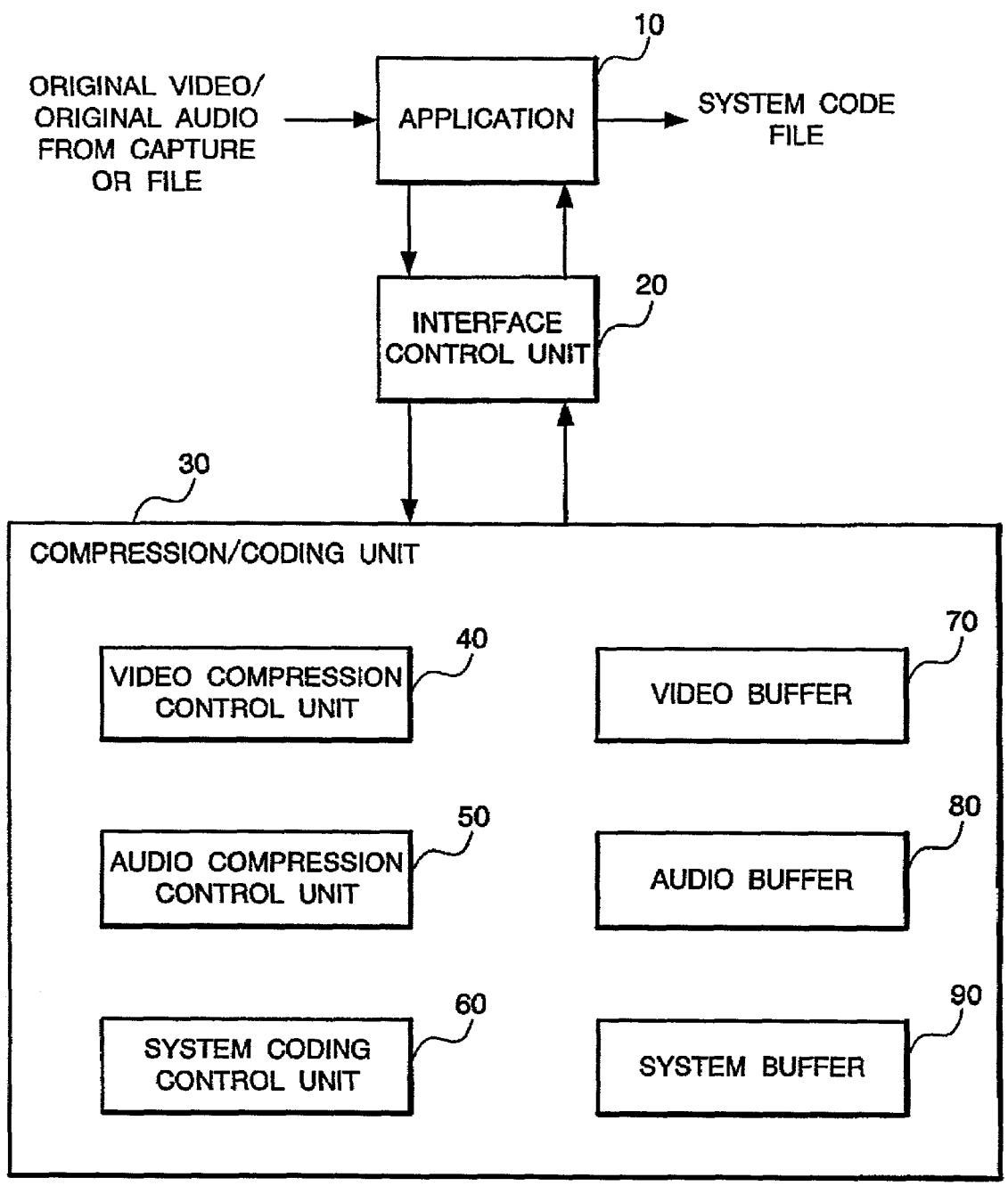
FIG. 1 is a block diagram showing a structure of a long-hour video/audio compression device according to one embodiment of the present invention.

FIG. 1 is a block diagram showing a structure of a long-hour video/audio compression device according to the embodiment of the present invention. In FIG. 1, the long-hour video/audio compression device according to the embodiment of the present invention includes an application program (hereinafter, referred to as application) 10 as a software program that a user operates, an interface control unit 20 for controlling compression operation in response to a request from the application 10 and a compression/coding unit 30 for conducting video compression/coding and audio compression/coding.

The compression/coding unit 30 includes a video compression control unit 40 for controlling video compression, an audio compression control unit 50 for controlling audio compression, a system coding control unit 60 for controlling system coding, a video buffer 70 for temporarily storing a video code, an audio buffer 80 for temporarily storing an audio code and a system buffer 90 for temporarily storing a system code.

The application 10 receives an original video and an original audio from a capture or a file not shown and transfers the same to the interface control unit 20 to write a system code generated by the interface control unit 20 into a system code file (not shown).

The interface control unit 20 controls the video compression control unit 40, the audio compression control unit 50 and the system coding control unit 60 of the compression/coding unit 30 to store a generated code in the video buffer 70, the audio buffer 80 and the system buffer 90 and transfer the codes to the application 10.

At this time, upon notification that codes are output up to a division unit by the interface control unit 20, the application 10 closes the current file after writing the code into the system code file and opens a subsequent new file.

Since the interface control unit 20 thus determines whether division should be made or not, the application 10 is allowed to divide a file without checking the contents of a code. In addition, although the application 10 conducts reception of an original video and an original audio and writing of a generated code into a file in FIG. 1, the interface control unit 20 may conduct these processing.

Figure 2:
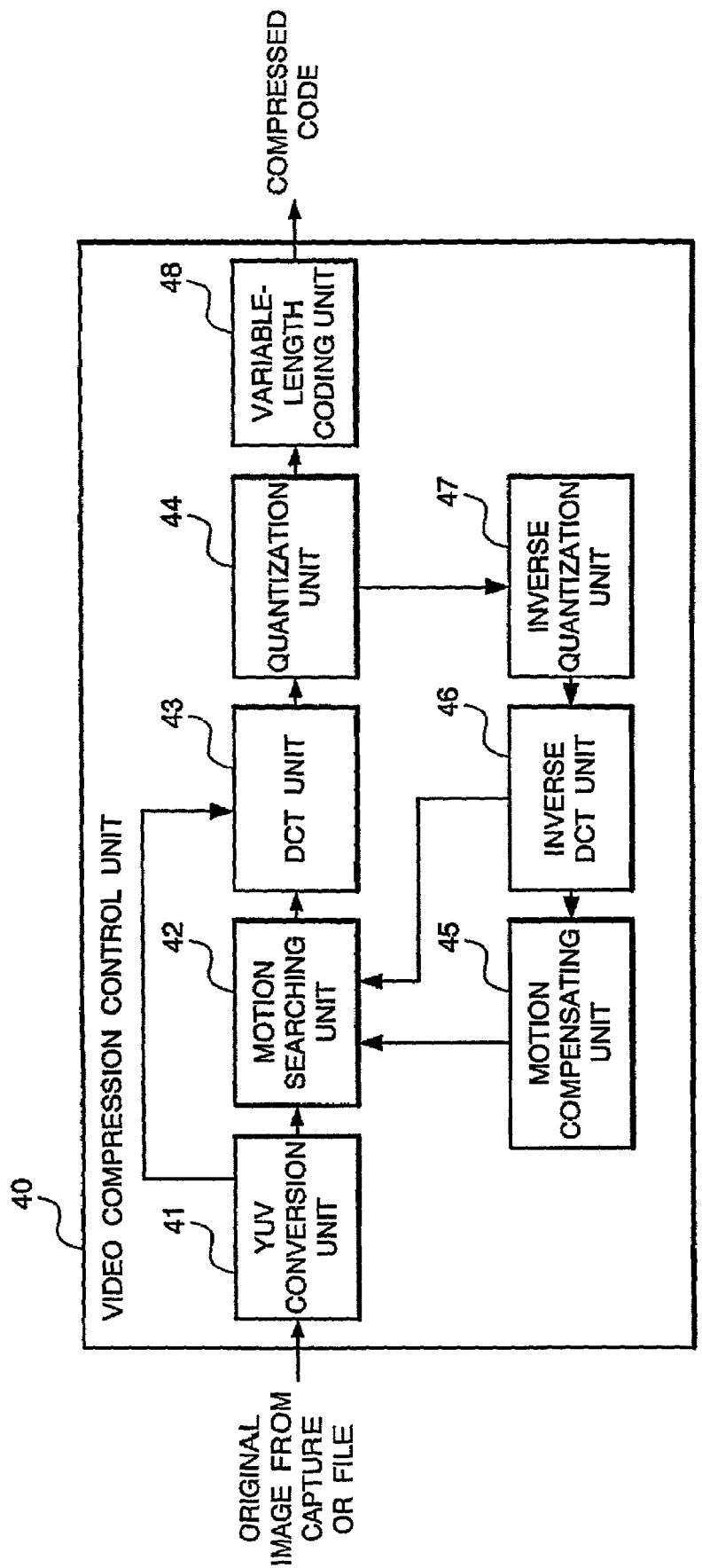
FIG. 2 is a block diagram showing a structure of a video compression control unit of FIG. 1.

FIG. 2 is a block diagram showing a structure of the video compression control unit 40 shown in FIG. 1. In FIG. 2, the video compression control unit 40 includes the YUV conversion unit 41 for converting an image to have a format of a color signal [YUV format: format in which a color signal is separated into a luminance signal (Y) and a color difference signal (Cb, Cr)] compressible by the MPEG, the motion searching unit 42 for searching each region of a block (16 pixels×16 pixels in MPEG) for motion of images in preceding/succeeding frames and a current frame, the DCT unit 43 for converting an image of a block into a space frequency, the quantization unit 44 for conducting quantization, the inverse quantization unit 47 for conducting inverse quantization for the restoration from quantization, the inverse DCT unit 46 for the restoration from frequency conversion, the motion compensating unit 45 for compensating for motion of an image on a block basis to generate a new reference frame and the variable-length coding unit 48 for conducting variable-length coding.

Image compression processing by the video compression control unit 40, as shown in FIG. 2, is realized by converting an original image from a capture or a file into YUV data by the YUV conversion unit 41 to conduct compression according to a kind of picture. In a case of an I picture [intra-coded picture (intra-frame coded frame), YUV data is divided into blocks, converted into a space frequency on a block basis by the DCT unit 43 and quantized by the quantization unit 44, and then variable-length coded by the variable-length coding unit 48 to output a compressed code. In addition, a quantized block is inversely quantized by the inverse quantization unit 47 and inversely frequency-converted by the inverse DCT unit 46 to generate a reference frame.

In a case of a P picture [predictive-coded picture (inter-frame coded frame)], YUV data is divided into blocks to obtain a block having the highest correlation among blocks of a preceding frame stored as a reference frame by the motion searching unit 42 on a block basis and a difference from the block of the preceding frame having the highest correlation is converted into a space frequency by the DCT unit 43, quantized by the quantization unit 44 and then variable-length coded by the variable-length coding unit 48 to output a compressed code. In addition, a quantized block is inversely quantized by the inverse quantization unit 47, inversely frequency-converted by the inverse DCT unit 46 and then added to a block whose motion is compensated for by the motion compensating unit 45 to generate a reference frame.

In a case of a B picture [bidirectionally predictive-coded picture (intra-frame inserted coded frame)], YUV data is divided into blocks to obtain a block having the highest correlation among blocks of preceding/succeeding frames stored as a reference frame by the motion searching unit 42 on a block basis and a difference from the block of the preceding/succeeding frame having the highest correlation is converted into a space frequency by the DCT unit 43, quantized by the quantization unit 44 and then variable-length coded by the variable-length coding unit 48 to output a compressed code. In the case of a B picture, generation of a reference frame is unnecessary.

Figure 3:
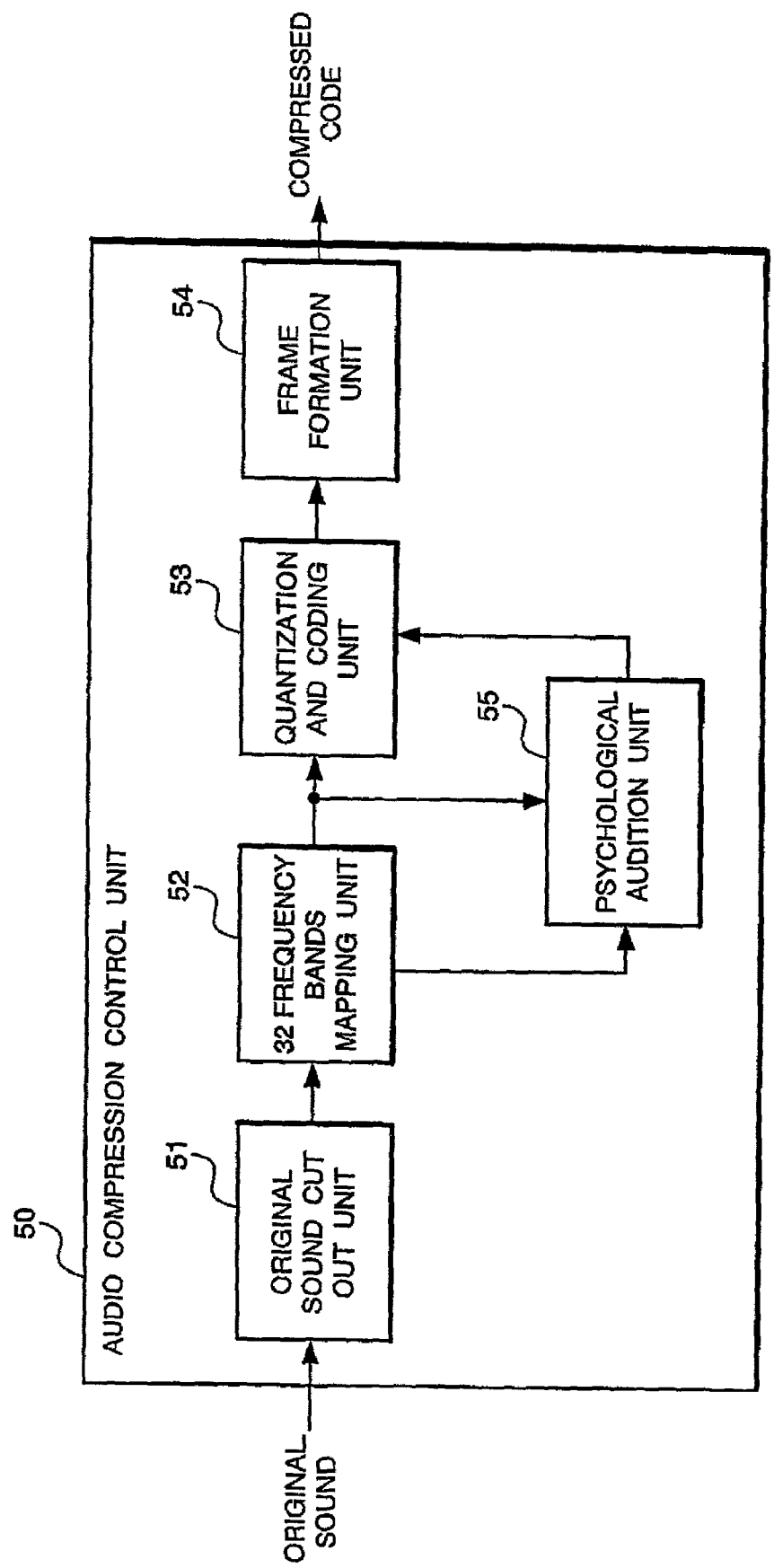
FIG. 3 is a block diagram showing a structure of an audio compression control unit of FIG. 1.

FIG. 3 is a block diagram showing a structure of the audio compression control unit 50 shown in FIG. 1. In FIG. 3, the audio compression control unit 50 includes the original sound cut out unit 51 for cutting out original sound data of one AAU (Audio Access Unit) from an original sound, the 32 frequency bands mapping unit 52 for conducting frequency band mapping processing on an AAU basis, the quantization and coding unit 53 for conducting linear quantization and coding, the frame formation unit 54 for generating compressed data of one AAU by adding additional information to coded data and the psychological audition unit 55 for conducting psychological audition processing.

The audio compression processing by the audio compression control unit 50, as shown in FIG. 3, is realized by cutting out one AAU (1152 samples in a case of MPEG audio layer 2) from an original sound by the original sound cut out unit 51 and compressing the same on an AAU basis. The 32 frequency bands mapping unit 52 dissolves an input signal into sub band signals of 32 bands by a sub band analysis filter and calculates a scale factor of each sub band signal to equalize dynamic ranges.

The psychological audition unit 55 fast-Fourier-transforms an input signal and calculates a masking of psychological audition based on the conversion result to calculate bit assignment to each sub band. The quantization and coding unit 53 conducts quantization and coding according to the determined bit assignment. The frame formation unit 54 adds a header or subsidiary information to the quantized and coded sub band signal and shapes the signal into a bit stream to output the signal as a compressed code.

Figure 4:
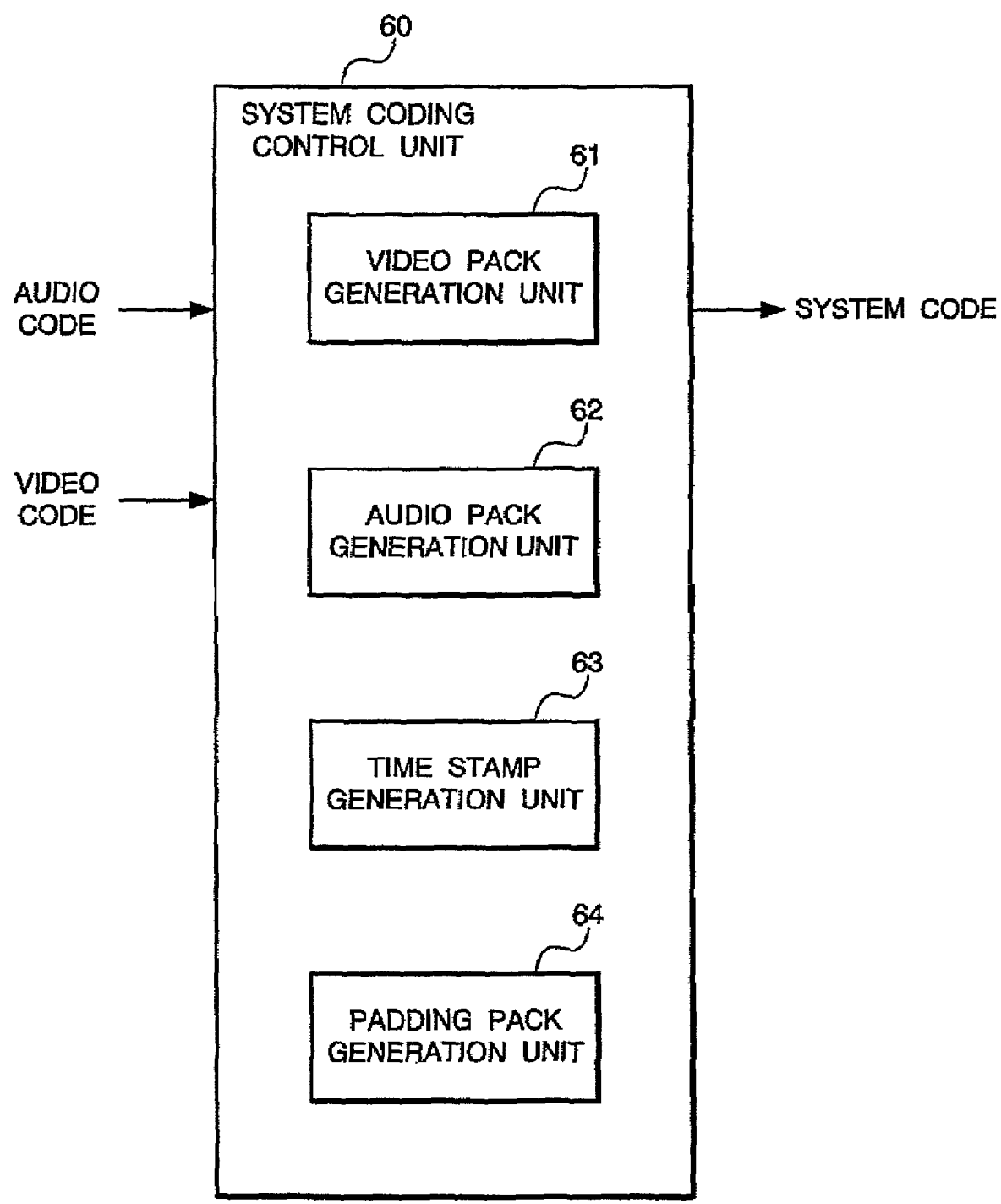
FIG. 4 is a block diagram showing a structure of a system coding control unit of FIG. 1.

FIG. 4 is a block diagram showing a structure of the system coding control unit 60 shown in FIG. 1. In FIG. 4, the system coding control unit 60 includes the video pack generation unit 61 for packing a video code, the audio pack generation unit 62 for packing an audio code, the time stamp generation unit 63 for generating a time stamp to be inserted into a packet header and the padding pack generation unit 64 for generating a padding pack to be skipped by a decoder for the adjustment of a bit rate.

In system coding by the system coding control unit 60, as shown in FIG. 4, upon reception of a video code and an audio code, the unit 60 controls the video pack generation unit 61 and the audio pack generation unit 62 to output a system code. The video pack generation unit 61 cuts out data of a packet from the video code and adds a packet header and a pack header to the data. The audio pack generation unit 62 cuts out data of a packet from the audio code and adds a packet header and a pack header to the data.

At this time, in a case of a video code, when the head of a frame is contained in packet data, a PTS (Presentation Time Stamp) or a DTS (Decoding Time Stamp) generated at the time stamp generation unit 63 is inserted. In a case of an audio code, if the head of an AAU is contained in packet data, a PTS generated at the time stamp generation unit 63 is inserted. In addition, the padding pack generation unit 64 inserts a padding pack so as to have an average system bit rate.

Figure 5:
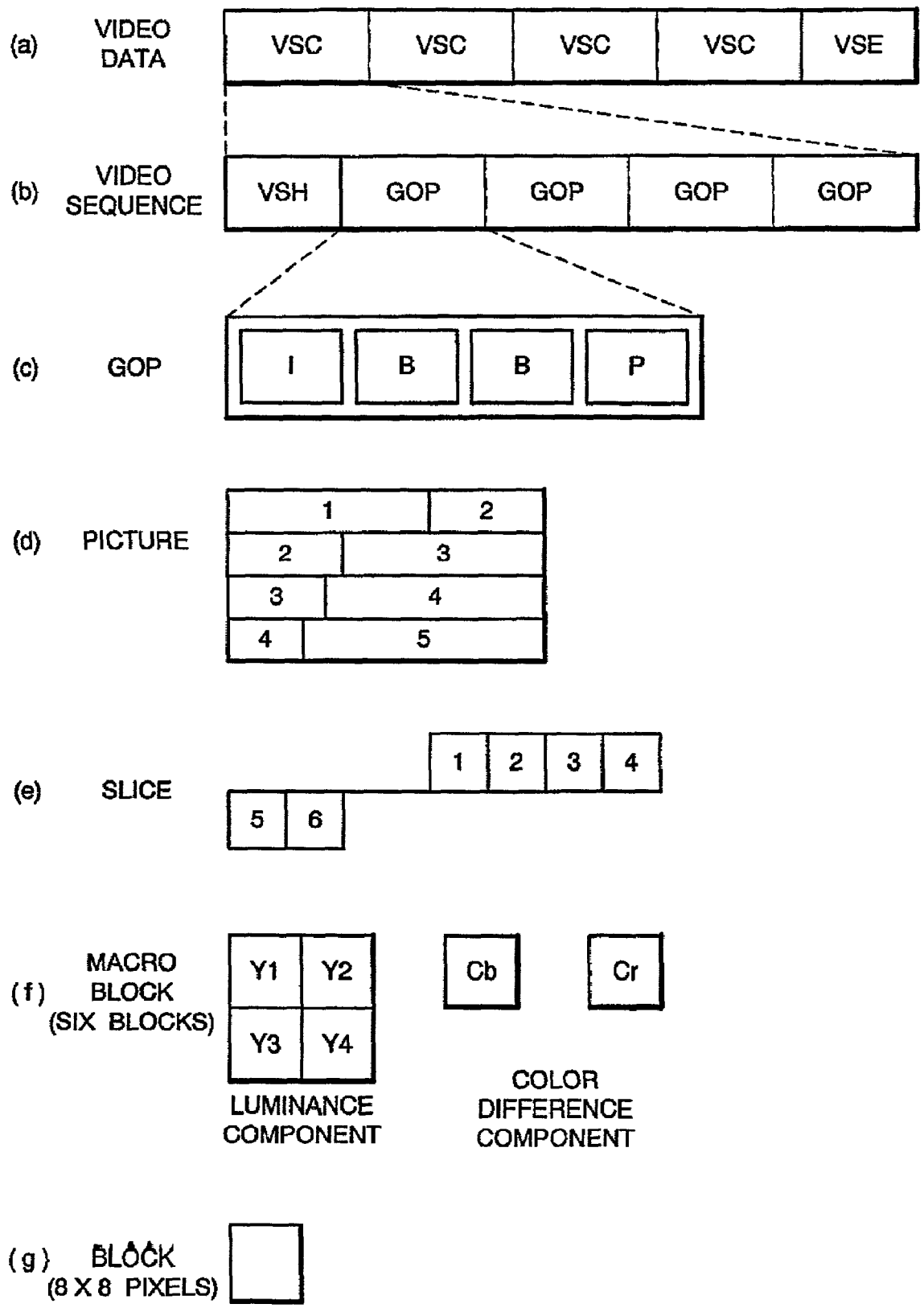
FIG. 5 is a diagram showing an arrangement of a code format conformed to MPEG video.
Figure 7:
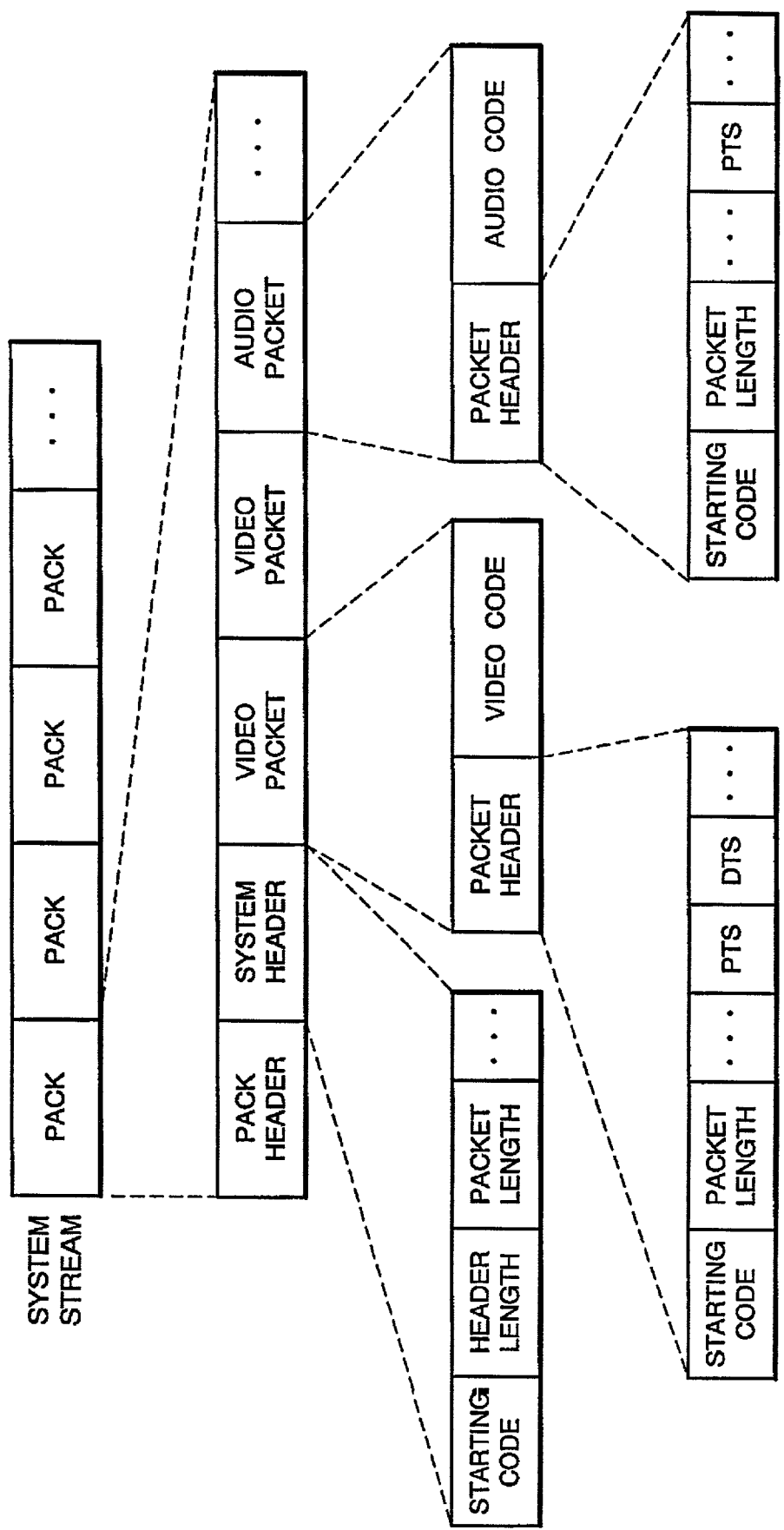
FIG. 7 is a diagram showing arrangement of a multiplexing format of video code/audio code conformed to an MPEG system.

FIG. 5 is a diagram showing an arrangement of a code format conformed to MPEG video, FIG. 6 is a diagram showing arrangement of a code format conformed to MPEG audio, and FIG. 7 is a diagram showing an arrangement of a multiplexing format of video code/audio code conformed to an MPEG system. With reference to FIGS. 5 to 7, description will be made of a case of an MPEG (Moving Picture Experts Group) compression system.

Video data is composed of at least one video sequence (VSC) and ends with a video sequence end code (VSE) [see (a) in FIG. 5]. Video sequence is composed of a video sequence header (VSH) and at least one GOP (Group of Picture) [see (b) in FIG. 5].

GOP is composed of at least one picture (I picture, B picture, P picture) [see (c) in FIG. 5], each of which picture shows one video. At the head of a picture, a picture header containing information such as a kind of picture is placed. Picture has three kinds, an I picture composed only of intra-frame codes, a P picture composed of inter-frame codes only in a forward direction, and a B picture composed of inter-frame codes in both forward and backward directions. Picture is composed of a plurality of slices divided into arbitrary regions [see (d) in FIG. 5].

Slice is composed of a plurality of macro blocks arranged from left to right or up to down in order [see (e) in FIG. 5]. Macro block is roughly classified into two, an intra-block which is an intra-frame code and an inter-block which is an inter-frame code in a forward direction or both directions. While an I picture is composed only of intra-blocks, a P picture and a B picture in some cases contain not only an inter-block but also an intra-block.

Macro block is composed of six blocks including luminance components (Y1, Y2, Y3, Y4) obtained by further dividing a block of 16×16 dots into blocks of 8×8 dots and color difference components (Cb, Cr) of blocks of 8×8 dots whose regions correspond to the luminance components [see (f) in FIG. 5]. A block of 8×8 dots forms the minimum unit of coding [see (g) in FIG. 5].

Audio data is composed of one audio sequence which is composed of at least one AAU (Audio Access Unit: audio decoding unit) [see (a) in FIG. 6]. One AAU is composed of an AAU header containing such information as a synchronous word, a bit rate and a sampling frequency and a compressed audio code [see (b) in FIG. 6]. One AAU forms the minimum unit of coding.

In FIG. 7, video code/audio code is composed of one system stream which is composed of a plurality of packs. A pack consists of a pack header, a system header, and one or more packets. A system header has information, such as the bit rate. The pack of the 2nd henceforth does not need to have a system header. Packet includes a video packet and an audio packet.

Of these packets, the video packet is composed of a packet header and a video code. Sequencing only the video codes taken out of the video packets makes a series of video sequences. A packet header of the video packet is composed of a packet starting code, a code indicative of a packet length (the total number of bytes of packet data immediately following the packet length), PTS (Presentation Time Stamp) indicative of a time of reproduction output, DTS (Decoding Time Stamp) indicative of a time of decoding and the like.

In a video code, since an I picture and a P picture are coded prior to a B picture, the order of decoding might be different from that of reproduction. Therefore, two kinds of codes are prepared for indicating time, one for reproduction and the other for decoding, and when time of decoding and time of reproduction differ from each other, both of the PTS and the DTS are output. When time of decoding is the same as that of reproduction, only the PTS is output.

In addition, the audio packet is composed of a packet header and an audio code. Sequencing only the audio codes taken out of the audio packets makes a series of audio sequences. A packet header of the audio packet is composed of a packet starting code, a code indicative of a packet length, PTS indicative of time of reproduction output and the like. Since in an audio code, the order of decoding and that of reproduction are the same, only the PTS is output. When the PTS of the video packet and the PTS of the audio packet coincide with each other, the codes will be simultaneously reproduced.

Figure 8:
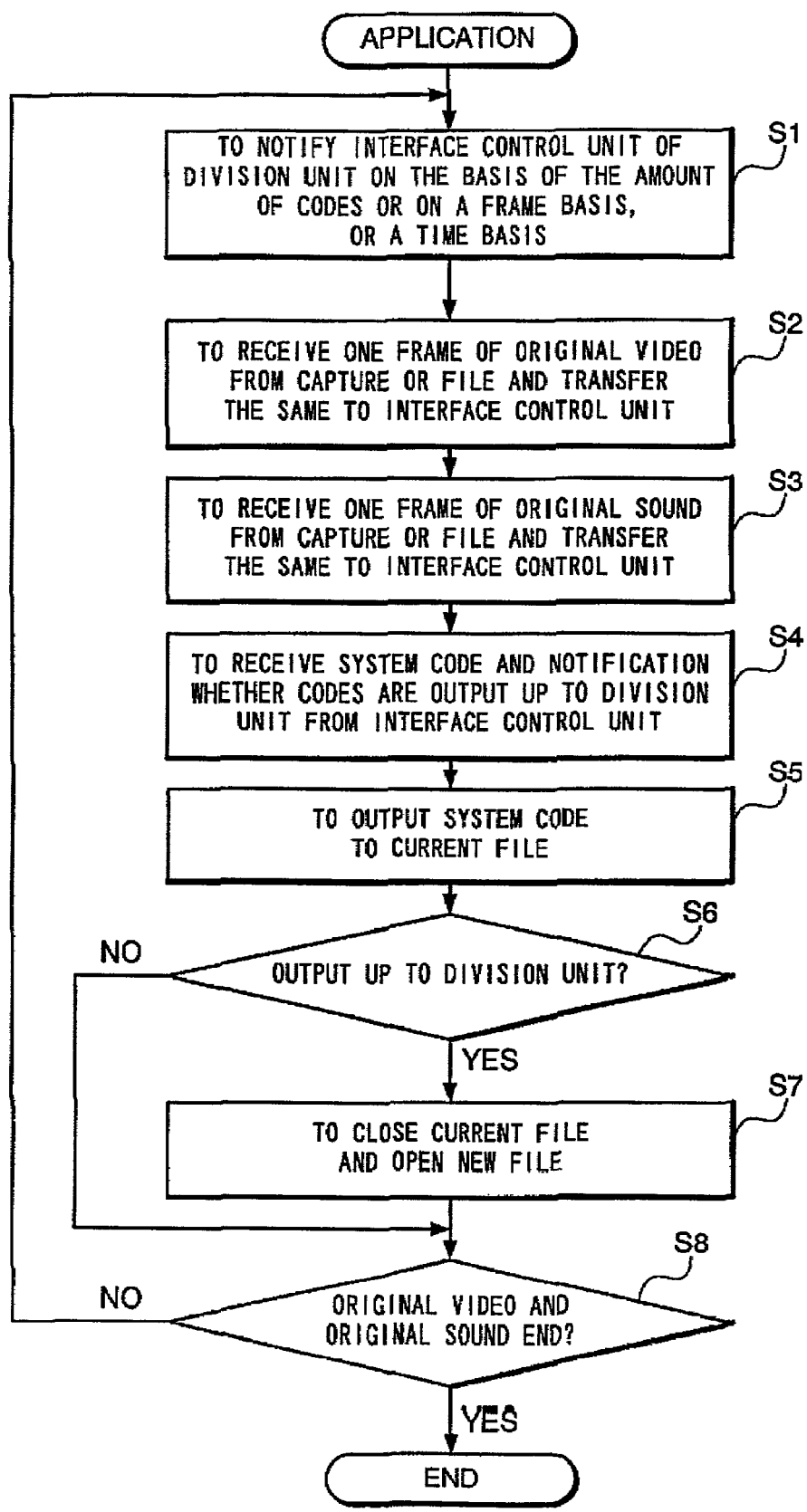
FIG. 8 is a flow chart showing processing operation of an application shown in FIG. 1.
Figure 9:
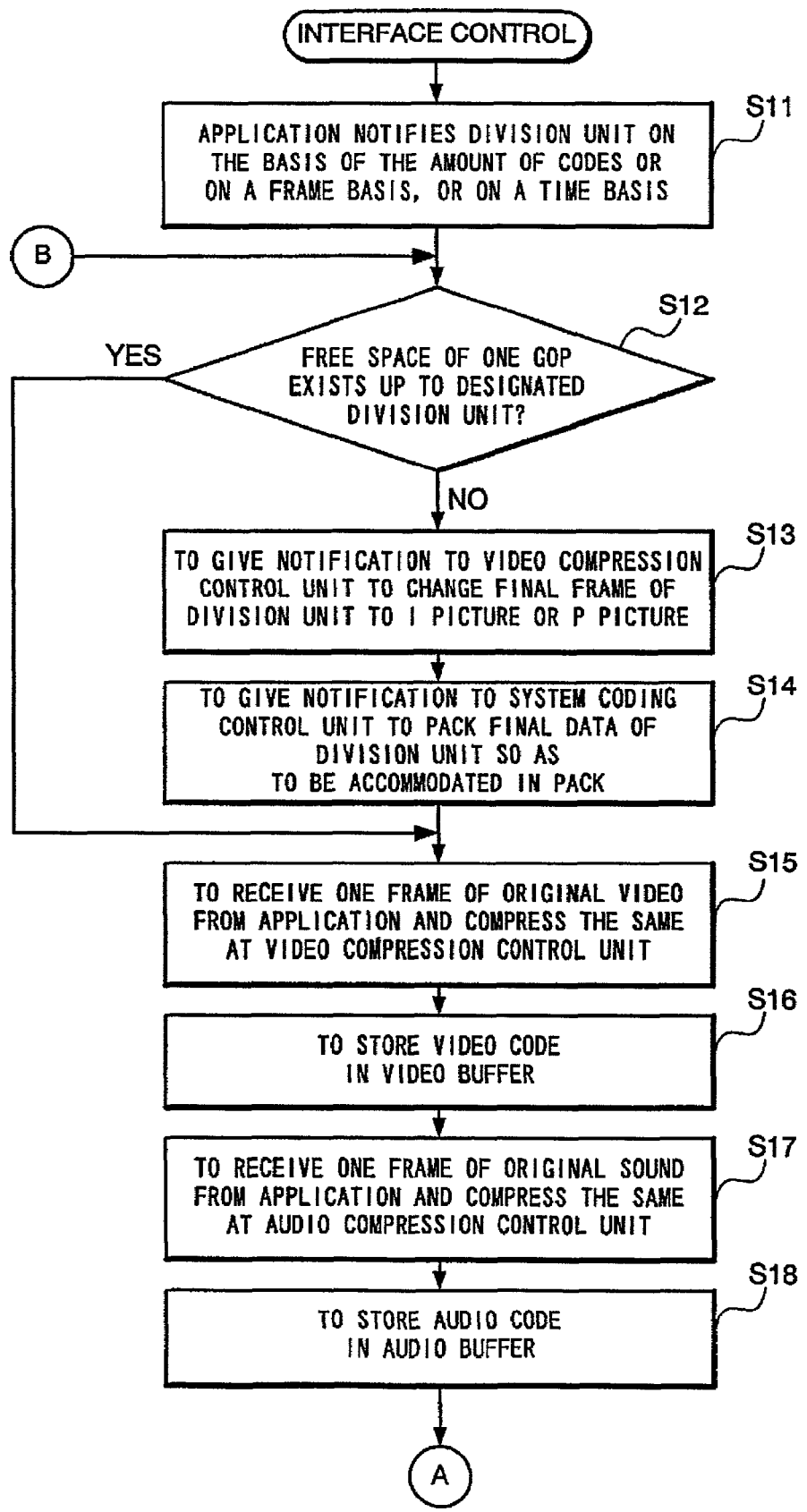
FIG. 9 is a flow chart showing processing operation of an interface control unit shown in FIG. 1.
Figure 10:
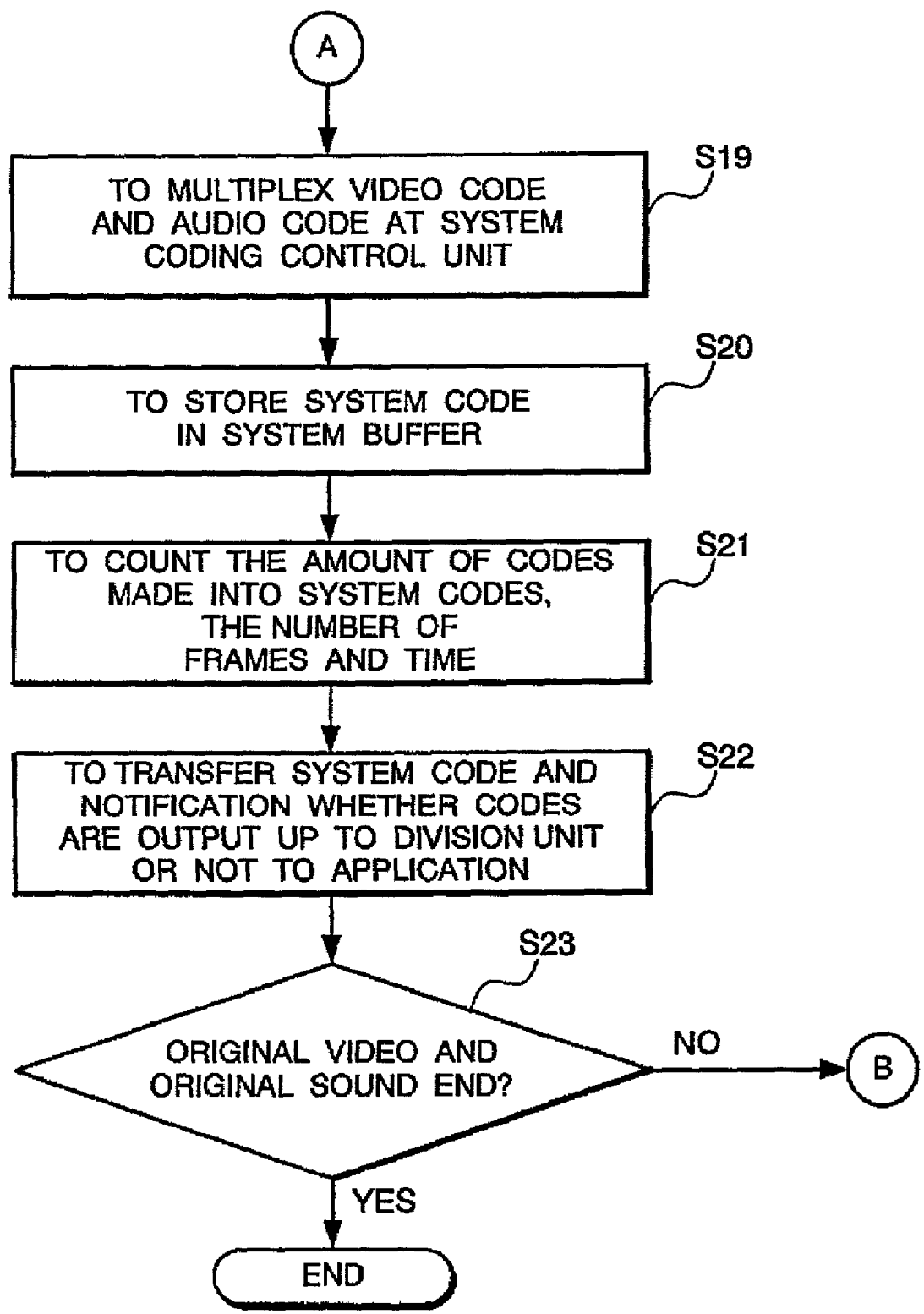
FIG. 10 is a flow chart showing processing operation of the interface control unit shown in FIG. 1.
Figure 11:
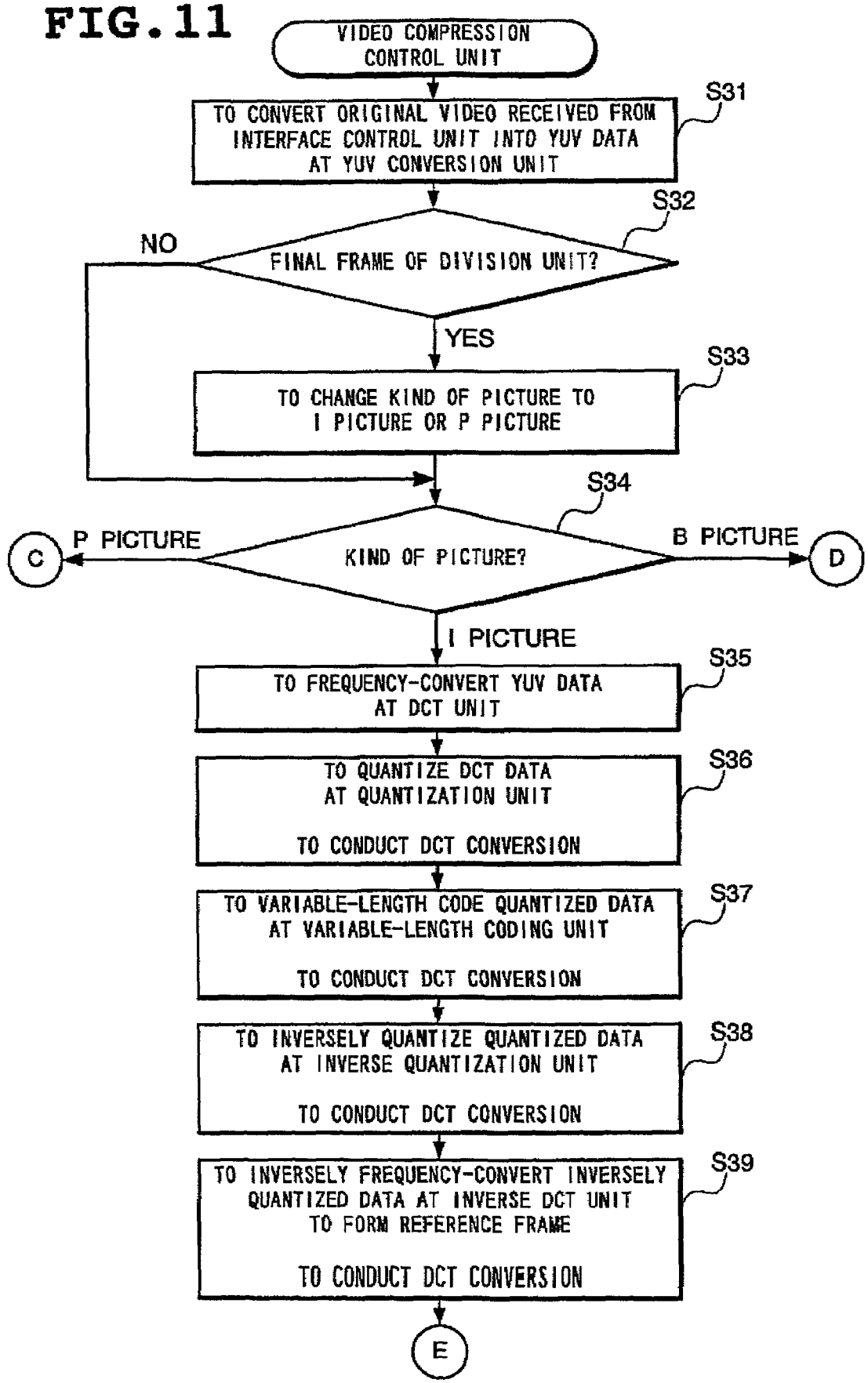
FIG. 11 is a flow chart showing processing operation of the video compression control unit shown in FIGS. 1 and 2.
Figure 12:
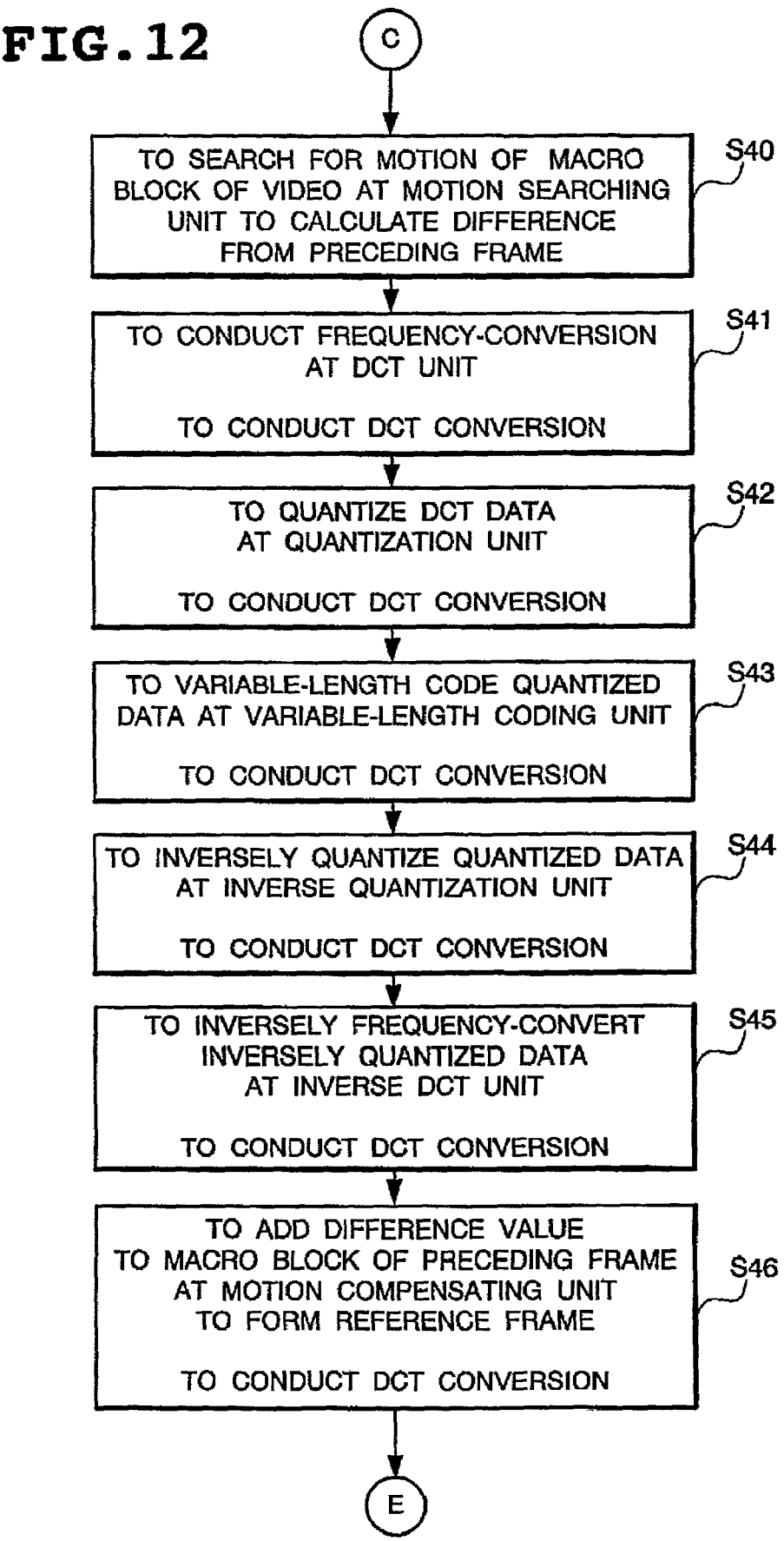
FIG. 12 is a flow chart showing processing operation of the video compression control unit shown in FIGS. 1 and 2.
Figure 13:
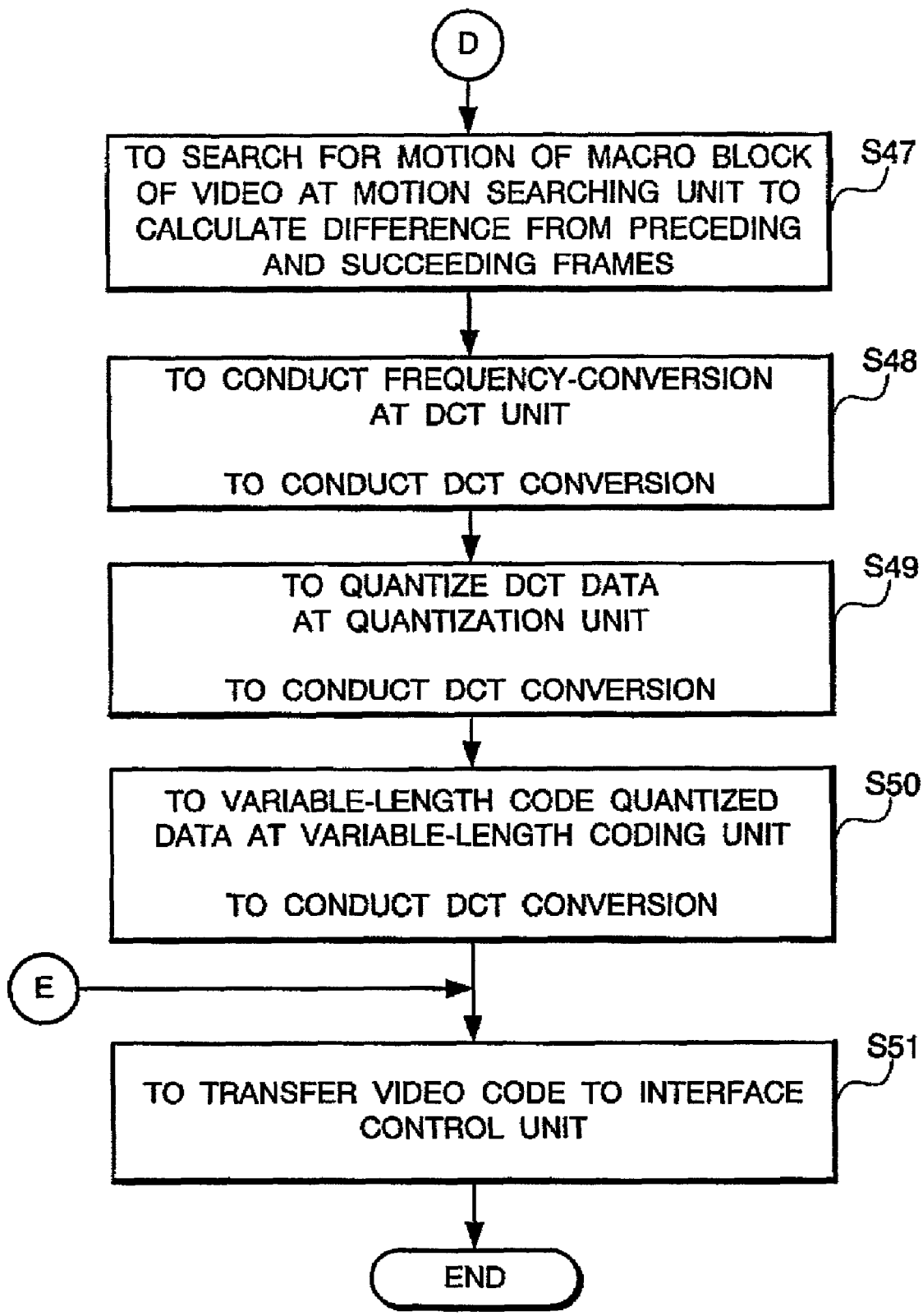
FIG. 13 is a flow chart showing processing operation of the video compression control unit shown in FIGS. 1 and 2.

FIG. 8 is a flow chart showing processing operation of the application 10 shown in FIG. 1, while FIGS. 9 and 10 are flow charts showing processing operation of the interface control unit 20 shown in FIG. 1. FIGS. 11 to 13 are flow charts showing processing operation of the video compression control unit 40 shown in FIGS. 1 and 2, FIGS. 14 and 15 are flow charts showing processing operation of the system coding control unit 60 shown in FIGS. 1 and 3, and FIGS. 16 to 19 are flow charts showing pack generation processing in the embodiment of the present invention.

With reference to FIGS. 1 to 19, description will be made of processing operation of the long-hour video/audio compression device according to the embodiment of the present invention. In the following, description will be made of compression operation conducted for compressing videos and audio applied from a capture or a file based on MPEG to output to a plurality of files.

The application 10 notifies the interface control unit 20 of a division unit on the basis of the amount of codes or on a frame basis, or a time basis (Step S1 of FIG. 8), receives one frame of an original video from a capture or a file and transfers the same to the interface control unit 20 (Step S2 of FIG. 8), and receives an original sound of one-frame time from the capture or the file and transfers the same to the interface control unit 20 (Step S3 of FIG. 8).

Upon receiving a system code and a notification whether codes are output up to a division unit from the interface control unit 20 (Step S4 of FIG. 8), the application 10 outputs the system code to the current file (Step S5 of FIG. 8).

The application 10 determines whether codes are output up to the division unit (Step S6 of FIG. 8) and upon determining that they are yet to be output up to the division unit, proceeds to Step S8. Upon determining that output is completed up to the division unit, the application 10 closes the current file and opens a new file (Step S7 of FIG. 8). The application 10 determines whether the original video and the original sound end or not (Step S8 of FIG. 8) and when they are yet to end, returns to Step S1 and when they end, finishes the processing.

Upon receiving the division unit on the basis of the amount of codes or on a frame basis, or on a time basis from the application 10 (Step S11 of FIG. 9), the interface control unit 20 determines whether there is a free space of one GOP up to the division unit designated by the application 10 (Step S12 of FIG. 9). Upon determining that there is a free space, the interface control unit 20 proceeds to Step S15. Upon determining that there is no free space, the interface control unit 20 notifies the video compression control unit 40 to that effect to change the final frame of the division unit to an I picture or a P picture (Step S13 of FIG. 9) and notifies the system coding control unit 60 to that effect to pack the final data of the division unit so as to be accommodated in a pack.(Step S14 of FIG. 9).

Upon receiving an original video of one frame from the application 10, the interface control unit 20 compresses the video at the video compression control unit 40 (Step S15 of FIG. 9) and stores a video code in the video buffer 70 (Step S16 of FIG. 9). Upon receiving an original sound of one-frame time from the application 10, the interface control unit 20 compresses the sound at the audio compression control unit 50 (Step S17 of FIG. 9) and stores an audio code in the audio buffer 80 (Step S18 of FIG. 9). The interface control unit 20 multiplexes the video code and the audio code at the system coding control unit 60 (Step S19 of FIG. 10) to store a system code in the system buffer 90 (Step S20 of FIG. 10).

The interface control unit 20 counts the amount of codes which are made into system codes, the number of frames and time (Step S21 of FIG. 10) and transfers the system code and a notification whether the codes are output up to the division unit to the application 10 (Step S22 of FIG. 10). The interface control unit 20 determines whether the original video and the original sound end or not (Step S23 of FIG. 10) and when they are yet to end, returns to Step S12 and when they end, finishes the processing.

Although in the processing operation shown in FIGS. 9 and 10, the application 10 designates the division unit to the interface control unit 20, the interface control unit 20 may calculate a division unit in a manner as shown in the following calculation example and notifies the application 10 of the calculated unit.

For example, assuming that System Bitrate [bit rate (bps) of system code] is denoted as Sa, Sequence Frame [the number of frames contained in one sequence (from a sequence header to its subsequent sequence header)] as Sb, Frame Rate [frame rate of video code] as f, Max File Size [upper limit of file size (number of bytes)] as m, Sequence Size [size of one sequence (the number of bytes)] as Sc, Sequence Count [upper limit of the number of sequences contained in one file] as Sd and Separate Size [division unit of System code (the number of bytes)] as Se, calculation of a division unit on the basis of a system code of one sequence will be as follows:

$Sc = (Sa/8) \times (Sb/f)$ $Sd = m/Sc$ (discard decimals)

$Se = Sd \times Sc \times \alpha$ where $\alpha$ is a value not less than 1 (value varying with a device).

More specifically, in a case where System Bitrate (Sa)=1228800, Sequence Frame (Sb)=30, Frame Rate (f)=30, Max File Size (m)=2147483648 (80000000H) bytes and $\alpha$=1.05, 2254855680 bytes will be a division unit as shown in the following.

That is, $$Sc = (Sa/8) \times (Sb/f)$$
$$= (1228800/8) \times (30/30)$$
$$= 153600$$
$$Sd = m/Sc$$
$$= 2147483648/153600$$
$$= 13981$$
$$Se = Sd \times Sc \times \alpha$$
$$= 13981 \times 153600 \times 1.05$$
$$= 2254855680$$

The video compression control unit 40 converts the original video received from the interface control unit 20 into YUV data at the YUV conversion unit 41 (Step S31 of FIG. 11) to determine whether it is the final frame of the division unit (Step S32 of FIG. 11). Upon determining that it is not the final frame, the video compression control unit 40 proceeds to Step S34. Upon determining that it is the final frame, the video compression control unit 40 changes the kind of picture to the I picture or the P picture (Step S33 of FIG. 11).

The video compression control unit 40 conducts processing of each picture according to a kind of picture (Step S34 of FIG. 11). Upon determining that it is an I picture, the video compression control unit 40 frequency-converts the YUV data at the DCT unit 43 (Step S35 of FIG. 11), quantizes the DCT data at the quantization unit 44 (Step S36 of FIG. 11) and variable-length codes the quantized data at the variable-length coding unit 48 (Step S37 of FIG. 11).

The video compression control unit 40 inversely quantizes the quantized data at the inverse quantization unit 47 (Step S38 of FIG. 11) and inversely frequency-converts the inversely quantized data at the inverse DCT unit 46 to form a reference frame (Step S39 of FIG. 11) and proceed to Step S51.

Upon determining that it is a P picture, the video compression control unit 40 searches for motion of a macro block of the video at the motion searching unit 42 (Step S40 of FIG. 12) to calculate a difference from a preceding frame (Step S40 of FIG. 12), conducts frequency-conversion at the DCT unit 43 (Step S41 of FIG. 12), quantizes the DCT data at the quantization unit 44 (Step S42 of FIG. 12) and variable-length codes the quantized data at the variable-length coding unit 48 (Step S43 of FIG. 12).

The video compression control unit 40 inversely quantizes the quantized data at the inverse quantization unit 47 (Step S44 of FIG. 12), inversely frequency-converts the inversely quantized data at the inverse DCT unit 46 (Step 845 of FIG. 12), adds the difference value to the macro block of the preceding frame at the motion compensating unit 45 to form a reference frame (Step S46 of FIG. 12) and proceed to Step B51.

Upon determining that it is a B picture, the video compression control unit 40 searches for motion of the macro block of the video to calculate a difference from preceding and succeeding frames at the motion searching unit 42 (Step 947 of FIG. 13), conducts frequency-conversion at the DCT unit 43 (Step 548 of FIG. 13), quantizes the DCT data at the quantization unit 44 (Step S49 of FIG. 13) and variable-length codes the quantized data at the variable-length coding unit 48 (Step 550 of FIG. 13). Thereafter, the video compression control unit 40 transfers the video code to the interface control unit 20 (Step S51 of FIG. 13) to end the processing.

Figure 14:
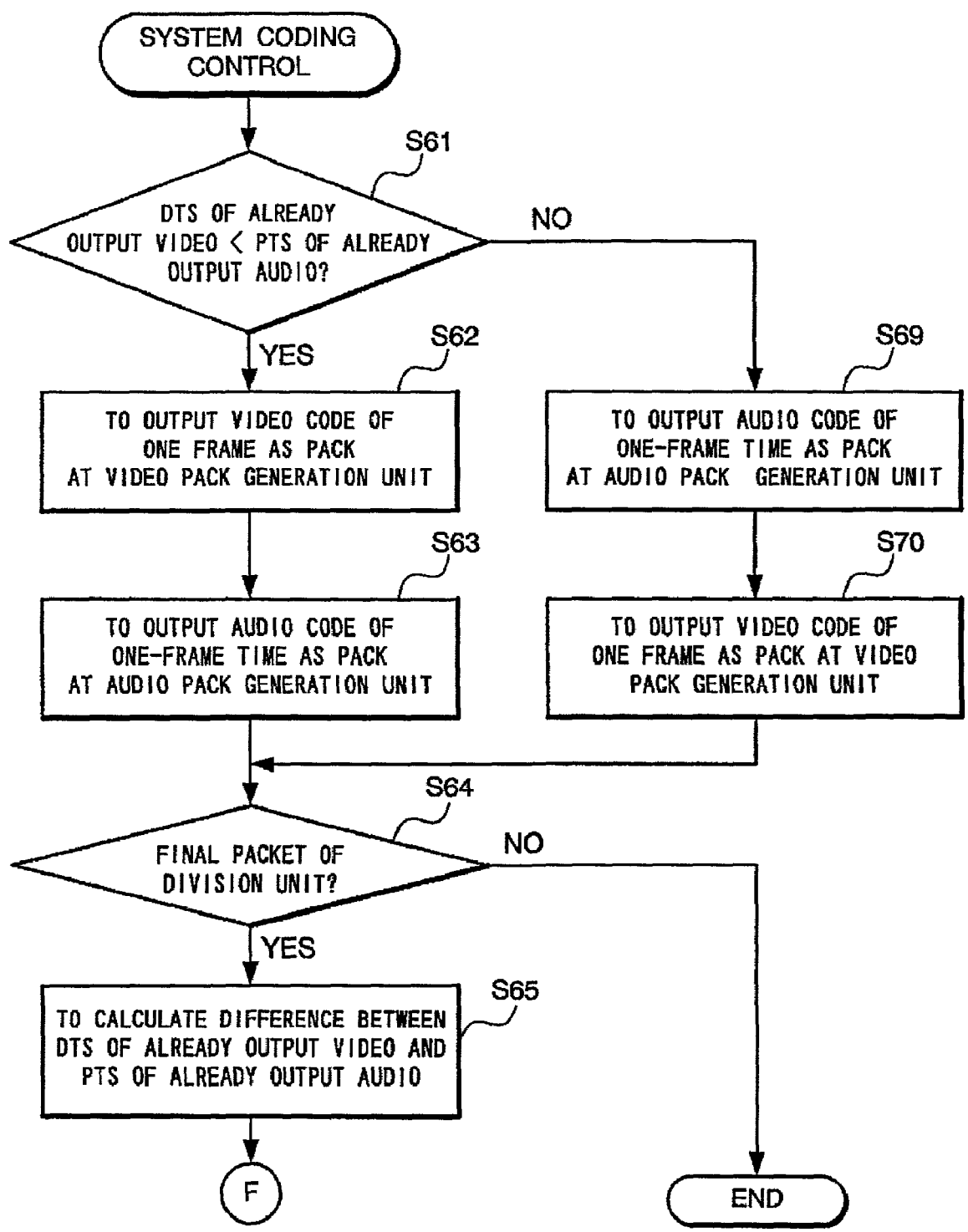
FIG. 14 is a flow chart showing processing operation of the system coding control unit shown in FIGS. 1 and 3.

The system coding control unit 60 determines whether a DTS of the video already output is smaller than a PTS of the audio already output (Step S61 of FIG. 14) and upon determination that it is smaller, the video pack generation unit 62 outputs the video codes of one frame as a pack (Step S62 of FIG. 14) and the audio pack generation unit 61 outputs the audio codes of one-frame time as a pack (Step S63 of FIG. 14).

Upon determination by the system coding control unit 60 that it is not smaller, the audio pack generation unit 61 outputs the audio codes of one-frame time (Step S69 of FIG. 14) as a pack and the video pack generation unit 62 outputs the video codes of one frame as a pack (Step S70 of FIG. 14).

The system coding control unit 60 determines whether it is the final packet of the division unit (Step S64 of FIG. 14) and when determining that it is not the final packet, finishes the processing. Upon determining that it is the final packet, the system coding control unit 60 calculates a difference between the time stamp of the video already output and the time stamp of the audio already output (Step S65 of FIG. 14).

The system coding control unit 60 determines whether the difference in time stamp is not less than the time of one frame (Step S66 o FIG. 15) and when determining that it is not less than the time of one frame, proceeds to Step S72. Upon determining that it is less than the time of one frame, the system coding control unit 60 determines whether the DTS of the video already output is smaller than the PTS of the audio already output (Step S67 of FIG. 15).

Figure 15:
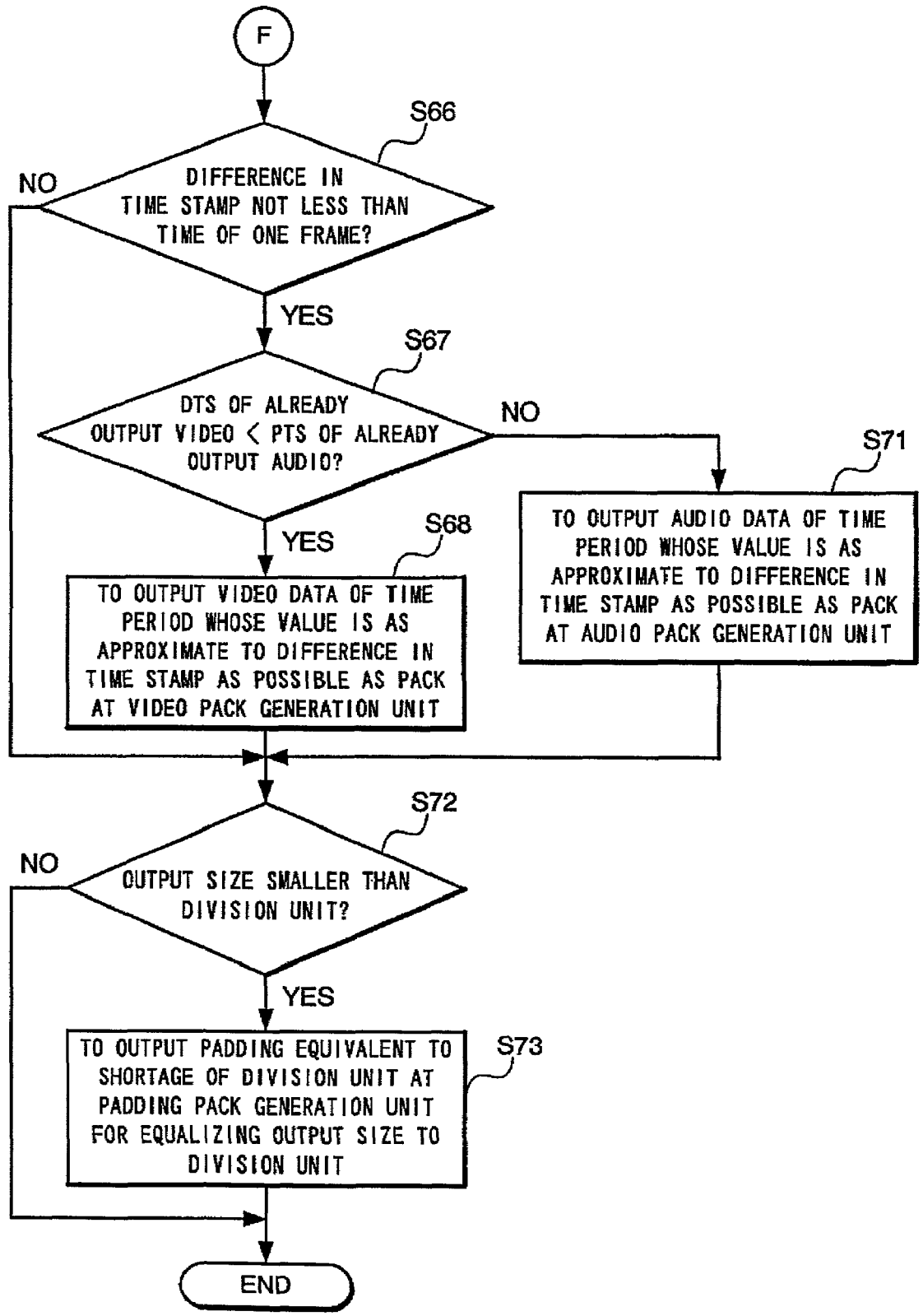
FIG. 15 is a flow chart showing processing operation of the system coding control unit shown in FIGS. 1 and 3.

Upon determining that it is smaller, the system coding control unit 60 outputs video data of a time period whose value is as approximate to the time stamp difference as possible as a pack at the video pack generation unit 62 (Step S68 of FIG. 15). Upon determining that it is not smaller, the system coding control unit 60 outputs audio data of a time period whose value is as approximate to the time stamp difference as possible as a pack at the audio pack generation unit 61 (Step S71 of FIG. 15).

The system coding control unit 60 determines whether the output size is smaller than the division unit or not (Step S72 of FIG. 15) and upon determining that it is not smaller, ends the processing. Upon determining that it is smaller, the system coding control unit 60 outputs a padding equivalent to a shortage of the division unit at the padding pack generation unit 64 in order to make the output size equal to the division unit (Step S73 of FIG. 15).

In the processing operation shown in FIGS. 14 and 15, while a DTS of video data is used, the largest PTS among PTSs of a plurality of pieces of video data near the end may be used.

Figure 16:
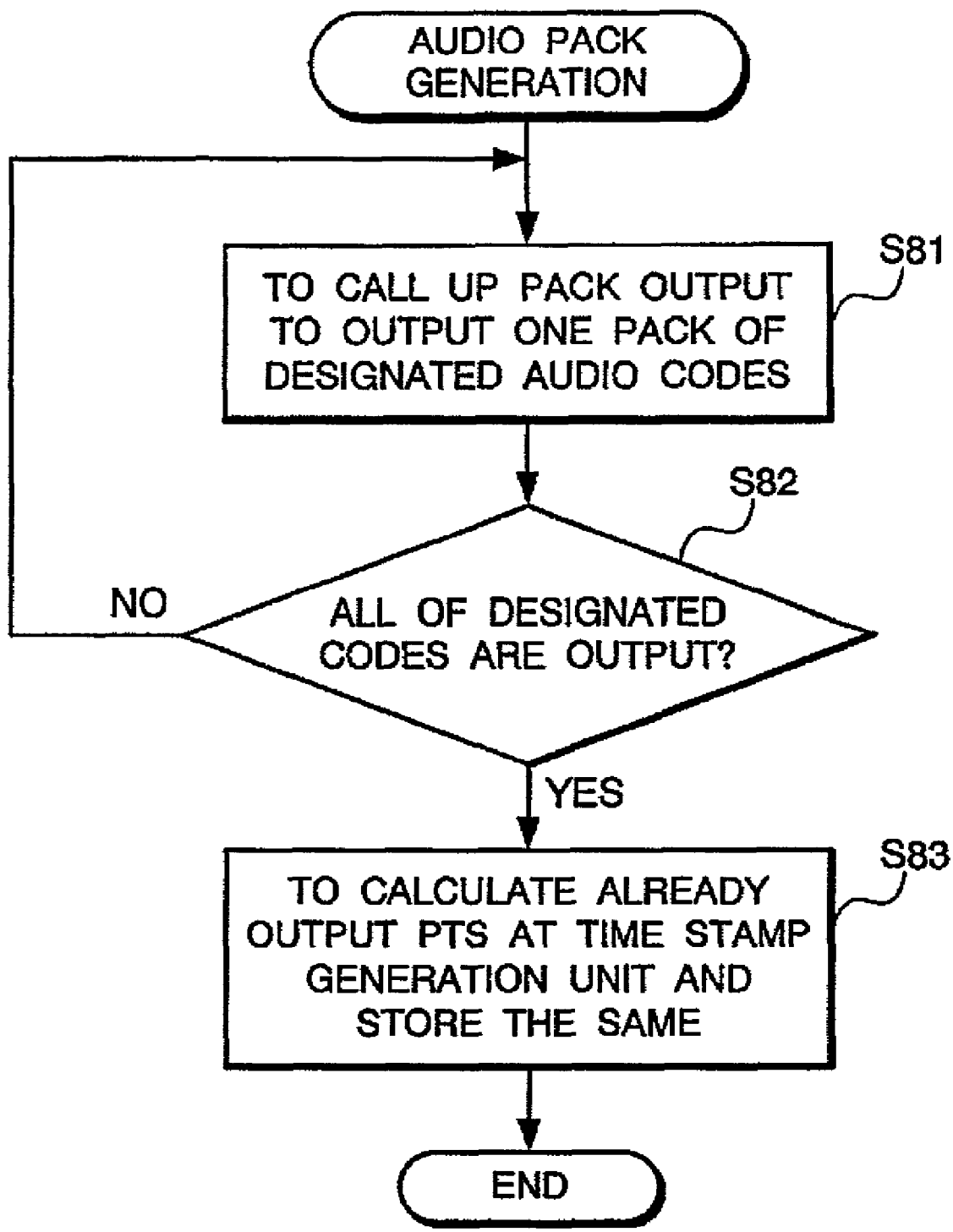
FIG. 16 is a flow chart showing pack generation processing in the embodiment of the present invention.

The audio pack generation unit 61 calls up pack output to output one pack of designated audio codes (Step S81 of FIG. 16) and determine whether all of the designated codes are output (Step S82 of FIG. 16) and when all is yet to be output, returns to Step S81 and when all is output, calculates the already output PTS at the time stamp generation unit 63 and stores the same (Step S83 of FIG. 16).

Figure 17:
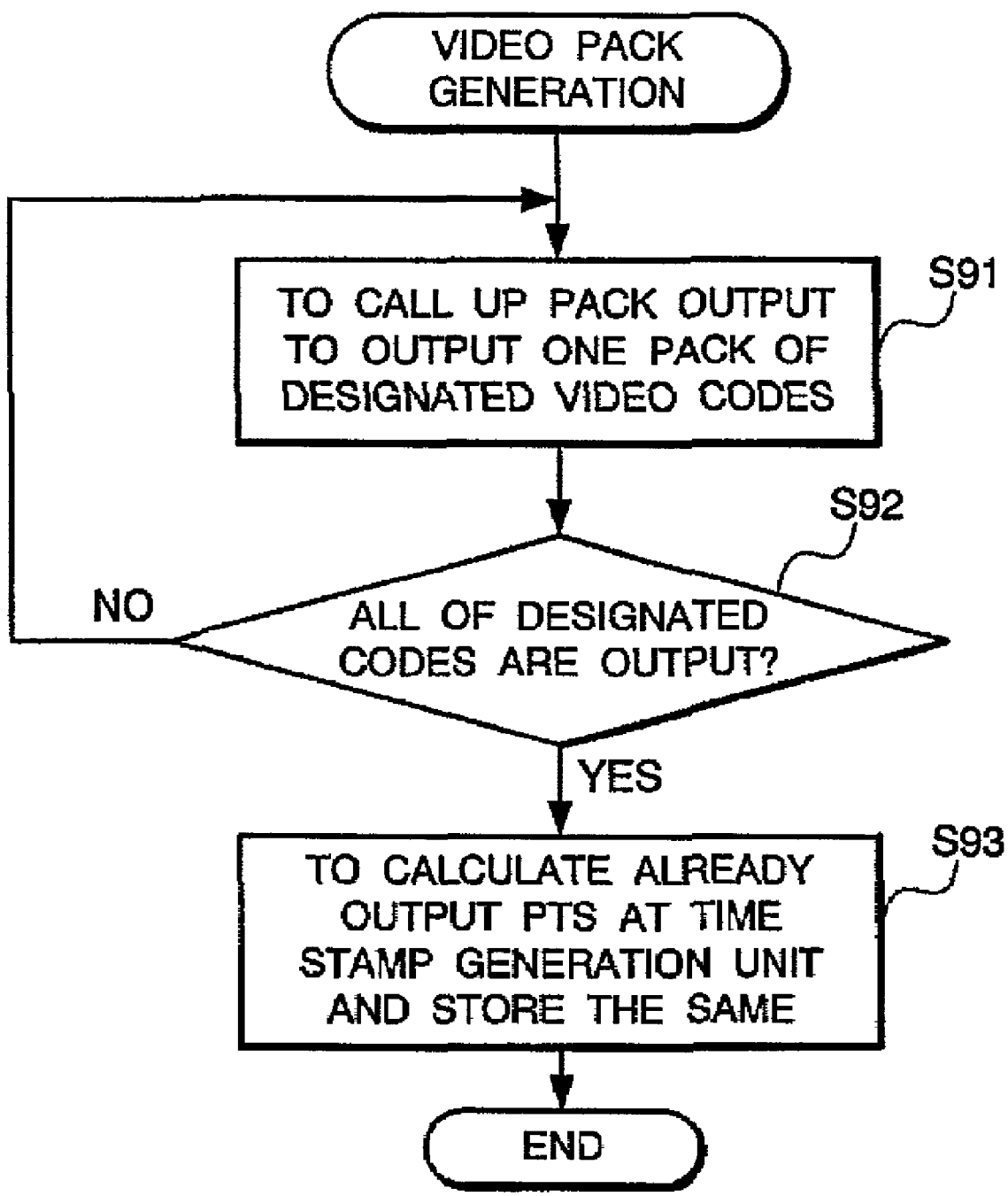
FIG. 17 is a flow chart showing pack generation processing in the embodiment of the present invention.
Figure 18:
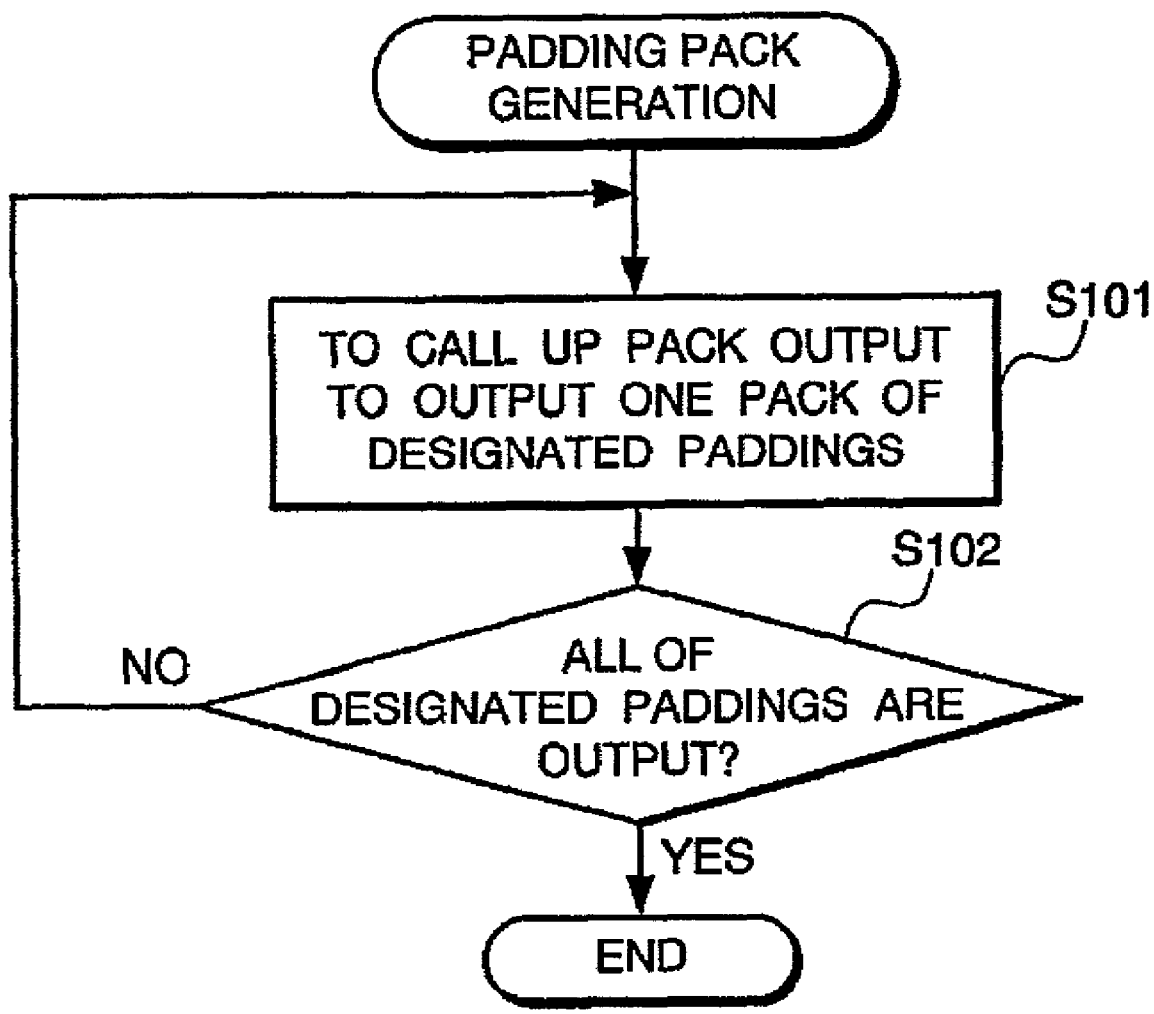
FIG. 18 is a flow chart showing pack generation processing in the embodiment of the present invention.

The video pack generation unit 62 calls up pack output to output one pack of designated video codes (Step S91 of FIG. 17) and determine whether all of the designated codes are output (Step S92 of FIG. 17) and when all is yet to be output, returns to Step S91 and when all is output, calculates the already output PTS at the time stamp generation unit 63 and stores the same (Step S93 of FIG. 17).

The padding pack generation unit 64 calls up pack output to output one pack of designated paddings (Step S101 of FIG. 18) and determine whether all of the designated paddings are output (Step S102 of FIG. 18) and when all is yet to be output, returns to Step S101 and when all is output, ends the processing.

Figure 19:
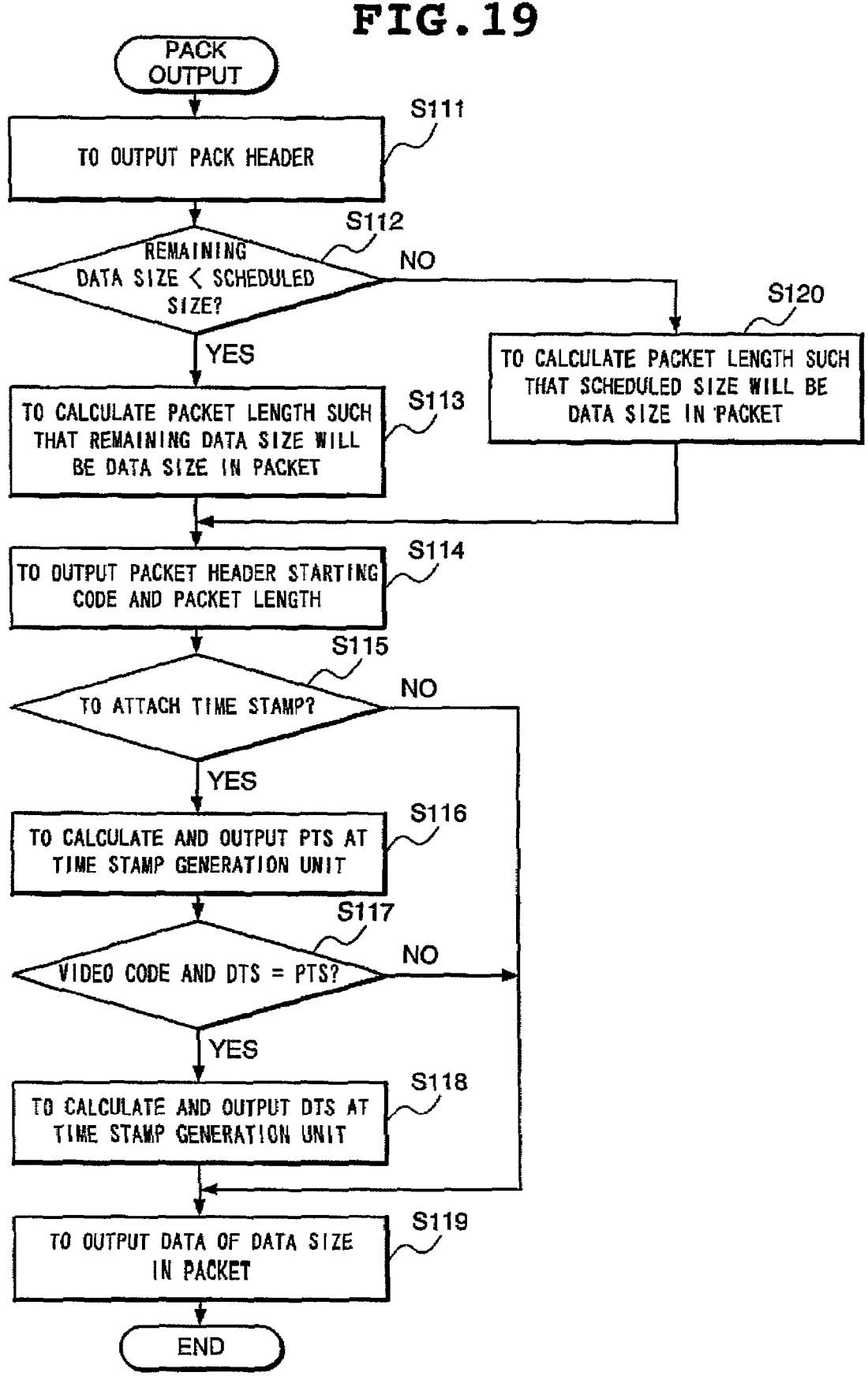
FIG. 19 is a flow chart showing pack generation processing in the embodiment of the present invention.

The system coding control unit 60 outputs a pack header at the time of pack output (Step S111 of FIG. 19) to determine whether the remaining data size is smaller than a scheduled size or not (Step S112 of FIG. 19). The scheduled size is a size of data to be stored in a predetermined packet, which ordinarily has a value obtained by subtracting a length of a pack header and that of a packet header from the value of the unit of 2048 bytes or 2324 bytes and which may have an arbitrary value. In addition, the size may be fixed at any time or may be changed each time.

Upon determining that the size is smaller, the system coding control unit 60 calculates a packet length such that the remaining data size will be the data size in the packet (Step S113 of FIG. 19). Upon determining that the size is not smaller, the system coding control unit 60 calculates a packet length such that the scheduled size will be the data size in the packet (Step S120 of FIG. 19).

The system coding control unit 60 outputs a packet header starting code and a packet length (Step S114 of FIG. 19) to determine whether a time stamp should be attached or not (Step S115 of FIG. 19). In a case where contents of the packet is video, when head portions of a sequence header, a GOP header and a picture header are contained, the time stamp will be attached to the video code, and in a case of audio, when a head portion of an AAU header is contained, the time stamp will be attached to the audio code.

Upon determining that no time stamp will be attached, the system coding control unit 60 proceeds to Step S119. Upon determining that a time stamp will be attached, the system coding control unit 60 calculates a PTS at the time stamp generation unit 63 and outputs the same (Step S116 of FIG. 19).

The system coding control unit 60 determines whether it is a video code and whether a DTS and a PTS differ in value or not (Step S117 of FIG. 19) and upon determining that it is not a video code or that values of the DTS and the PTS are not different from each other, proceeds to Step S119. Upon determining that it is a video code and the values of the DTS and the PTS are different from each other, the system coding control unit 60 calculates a DTS at the time stamp generation unit 63 and outputs the same (Step S118 of FIG. 19). Thereafter, the system coding control unit 60 outputs data of a data size in the packet (Step S119 of FIG. 19).

Figure 21:
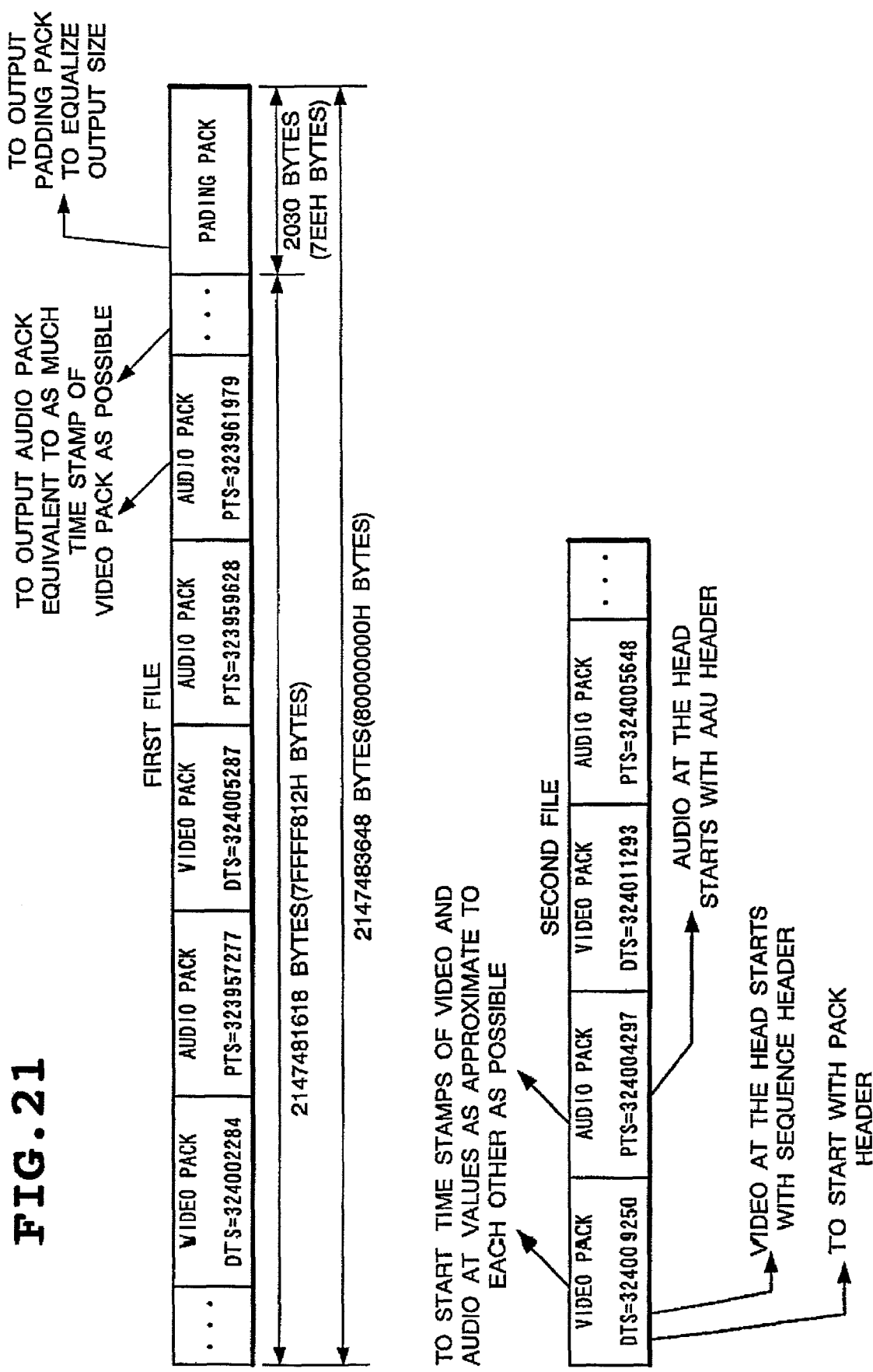
FIG. 21 is a diagram showing an example of a code at the division of a system code with a video code and an audio code multiplexed in the embodiment of the present invention.

FIG. 20 is a diagram showing an example of a code at the time of division of a video code according to the embodiment of the present invention and FIG. 21 is a diagram showing an example of a code at the time of division of a system code with a video code and an audio code multiplexed according to the embodiment of the present invention. With reference to FIGS. 20 and 21, description will be made of a code generated in the embodiment of the present invention.

Although in FIG. 20 which shows the example of a code at the time of division of a video code, the order of coding is illustrated in the order of display for the purpose of simplification, in the actual coding order, a B picture is placed after an I picture or a P picture.

In an ordinary case, a video code is composed of I, B, B, P, B, B, P, B, B, . . . , I. In such an arrangement, some of last B pictures are referred to over-two GOPs, so that division on a GOP basis is not possible. Therefore, all the last B pictures in the final GOP of the division unit are designed to be referred to only by the pictures in the GOP.

Since in the example shown in FIG. 20, the final frame corresponding to the amount of codes or the number of frames, or time of the division unit is a B picture, it is changed to a P picture. With this arrangement, the B picture at the final part refers to its preceding or succeeding P picture, so that it needs no reference to a picture in the subsequent file. In addition, since after the division, the code starts with an I picture with a sequence header and a GOP header attached, reference by a picture of the preceding file is unnecessary. Thus, since two divided video codes are completely independent of each other, each video code can be singly reproduced by a standard reproduction device.

Furthermore, although the B picture is changed to the P picture in the example shown in FIG. 20, it may be changed to an I picture and when the final frame is a P picture, it may be changed to an I picture.

Although the example illustrated in FIG. 20 shows no other GOP frame arrangement than the head GOP and the final GOP of each divided video code, any frame arrangement is possible as long as an I picture at the head of each divided code will not be referred to by a picture of a preceding code. Frame of a GOP may end with a P picture, for example, I, B, B, P, B, B, P, . . . , P or may be composed of only I pictures.

FIG. 21 shows an example of a code at the time of division of a system code with a video code and an audio code multiplexed, in which a frame rate of a video code is 29.97 fps, the sampling frequency of an audio code is 44.1 KHz, and the number of samples of one AAU is 1152 and the division size is 2147483648 bytes.

At the time of diving a system code, a video code and an audio code having the same reproduction time should be combined into one. A time stamp indicative of a reproduction time has a value based on the clock of 90000 Hz and in a case of a video code, it can be calculated according to the following expression:

the number of pictures×90000/frame rate

In a case of a frame rate of 29.97 fps, the time stamp will be 90000/29.97=3003 and at each frame, a time stamp of 3003 will be added.

On the other hand, in a case of an audio code, a time stamp can be calculated according to the following expression:

the number of AAUs×90000/(sampling frequency/the number of samples of one AAU)

In a case, for example, where the sampling frequency is 44.1 KHz and the number of samples of one AAU is 1152, the calculation will be as follows:

90000/(44100/1152)=2351 and at each AAU, the time stamp of 2351 will be added.

In the example illustrated in FIG. 21, a DTS of the final Video pack corresponding to the amount of codes or the number of frames, or time of the division unit of the first file is 324005287 and a PTS of the Audio pack to be subsequently output is 323959628, whereby a difference in reproduction time between the Audio and the Video will be the following value:

(324005287−323959628)/90000=45659/90000=0.507 (sec.)

However, this results in that reproduction of the Audio ends earlier than that of the Video in the first file. Therefore, Audio packs of as same the time-period as possible are output. Since an Audio code is decoded on an AAU basis, Audio codes equivalent to the number of AAUs (19) which is a value obtained by rounding (or round-off or round-up) the value "1145659/2351=19.42 are output as a pack.

Since 19 AAUs are output as a pack, a PTS of the Audio of the second file will start with the value as shown below.

323959628+2351×19=323959628+44669=324004297

On the other hand, a DTS of the head Video of the second file will start with the value of "324005287+3003=324008290".

As a result, a difference in reproduction time between the Audio and the Video of the second file will have the following value which enables the reproduction times to be considered substantially the same:

(324008290−324004297)/90000=3993/90000=0.044 seconds

Since a pack of audio codes of as equivalent a time period as possible to a DTS of the final video code of the division unit is output as described in the foregoing, it will be unnecessary to decode a video code and an audio code of the subsequent file in order to equalize reproduction times.

In addition, since after the division, the file will start with a video code having a sequence header and an audio code having an AAU header of approximately the same reproduction times, with a pack header having a system header attached thereto, it is unnecessary to decode a video code and an audio code of the preceding file for equalizing reproduction times. Since two system codes are completely independent of each other, each system code can be singly reproduced by a standard reproduction device. Furthermore, because a time stamp of each system code is sequential, linking each system code in order results in one enormous MPEG code.

Although in the example shown in FIG. 21, an Audio is output as a pack at a reproduction time of a Video, a Video may be conversely output as a pack at a reproduction time of an Audio. In addition, while in the example shown in FIG. 21, a DTS of a video code is used, the largest PTS among PTSs of a plurality of video codes near the end may be used.

Furthermore, although FIG. 21 fails to show the contents of a Video pack and an Audio pack, any arrangement is possible as long as a Video and an Audio start at approximately the same reproduction time. A pack size may have an arbitrary value and may be "one packet in one pack" or "a plurality of packets in one pack".

Moreover, in the example shown in FIG. 21, a padding pack equivalent to a shortage of the amount of codes as a division unit is output in order to equalize output sizes. An output size after the output of an Audio pack is 2147481618 bytes and a division size is 2147483648 bytes, so that the total size of a padding pack will have a value of "2147483648−2147481618=2030 (bytes)".

As described in the foregoing, since a padding pack is output in order to equalize output sizes, the application 10 can find a division unit simply from an output code size without checking the contents of a code. When a division unit is not assumed to be the amount of codes, no padding pack needs to be output.

Figure 22:
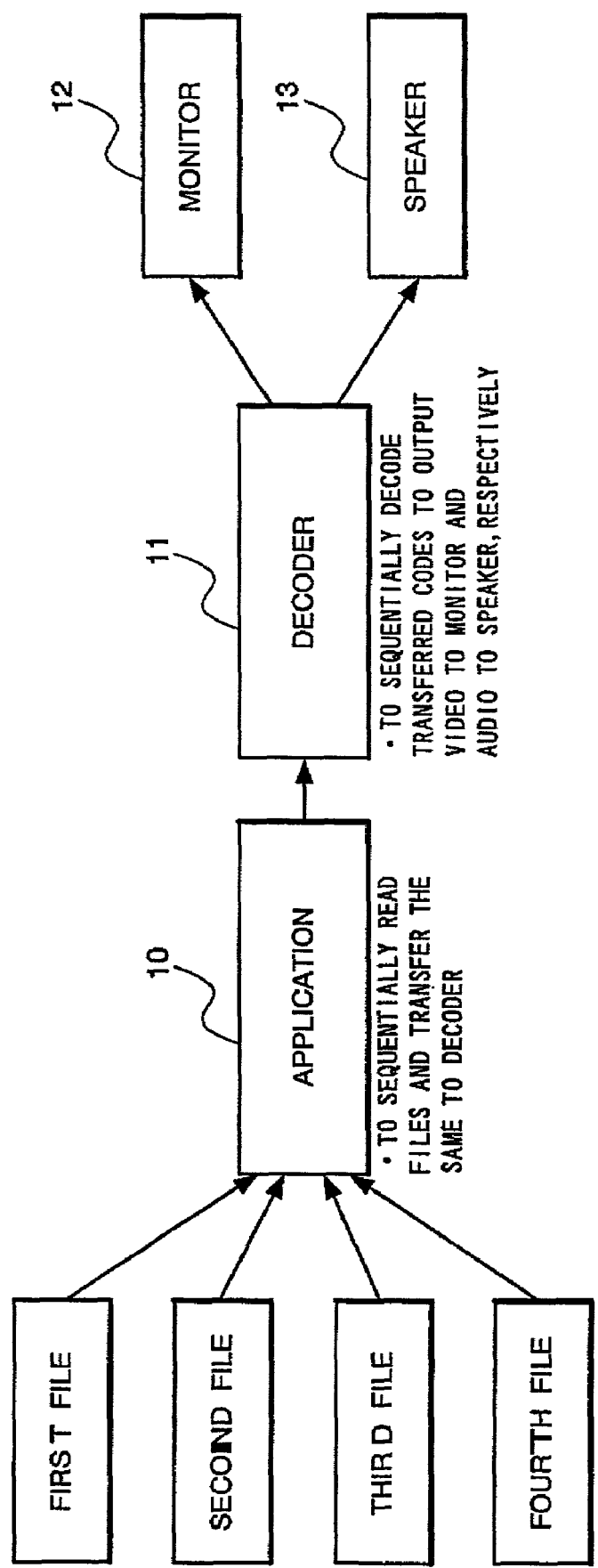
FIG. 22 is a diagram for use in explaining operation conducted at the reproduction of divided files as one file in the embodiment of the present invention.

FIG. 22 is a diagram for use in explaining operation conducted when divided files are reproduced as one file in the embodiment of the present invention. In FIG. 22, the application 10 sequentially reads each file and transfer the same to a decoder 11, the decoder 11 sequentially decodes transferred codes, displays a video code of the same PTS on a monitor 12 and outputs an audio code of the same PTS to a speaker 13.

As described above, although each system code shown in FIG. 21 is completely independent, a PTS indicative of a reproduction time is sequential, whereby linking each file enables reproduction as one enormous MPEG file.

By thus concentrating control of compression and multiplexing of videos/audio on the coding control device to prevent the application 10 from directly being concerned with compression and multiplexing processing, such a system can be set up as enables video/audio codes to be divided with ease without the need of the application 10 for checking the contents of an video code, a audio code and a system code.

In addition, with an arrangement in which each file starts with a pack header of a system code, its video code starts with a sequence header and a B picture at the head can be decoded only by an I picture and a P picture in a GOP at the head and its audio code starts with an AAU header, division such that time stamps of a video code and an audio code start at values as approximate to each other as possible results in making each file as an MPEG code completely independent of each other, whereby each divided file can be singly reproduced by a standard reproduction device.

Furthermore, since each file is conformed to the MPEG standard and singly reproducible, while sequencing time stamps indicative of a reproduction time enables reproduction of each file only by sequential reading of each file and transfer of the same to a decoder, combining the respective divided files into one by the application 10 enables reproduction by a standard reproduction device.

In the long-hour video/audio compression device according to the present embodiment, the functions of its components can be realized not only by hardware but also by loading a long-hour video/audio compression program which is a computer program having the functions of the respective components into a memory of a computer processing device. The long-hour video/audio compression program is stored in a magnetic disk, a semiconductor memory or other recording medium (reference number). Then, loading the program from the recording medium into the computer processing device to control operation of the computer processing device realizes each of the above-described functions.

As described in the foregoing, according to the long-hour video/audio compression device of the present invention, in a long-hour video/audio compression device for conducting long-hour recording on a system whose producible file size is limited and for controlling compression and coding and recording of videos and audio by the execution of an application program, an video code and a audio code can be divided with ease without the need of an application for checking the contents of an video code, a audio code and a system code by dividing an MPEG code on the basis of the amount of codes, the number of frames, or a time designated by the application program.

Moreover, according to another long-hour video/audio compression device of the present invention, arrangement such that each file starts with a pack of a system code obtained by multiplexing a video code which is obtained by coding an video and an audio code which is obtained by coding a audio at the time of division of an MPEG code allows each divided file to be singly reproduced by a standard reproduction device.

Moreover, according to a further long-hour video/audio compression device of the present invention, with a time stamp indicative of a reproduction time of a video code and a time stamp indicative of a reproduction time of an audio code arranged to start at values as approximate to each other as possible at the time of division of an MEPG code, each file combining the respective divided files into one by the application enables reproduction by a standard reproduction device.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A long-hour video/audio compression device for conducting long-hour recording on a system whose producible file size is limited and for conducting control of compression and coding and recording of videos and audio by the execution of an application program, comprising:
a division unit for dividing an MPEG (Moving Picture Expert Group) code on any bases of an amount of codes, a number of frames, and time designated by said application program, wherein
said division unit divides said MPEG code
such that said MPEG code starts with a pack of a system code obtained by multiplexing a video code which is obtained by coding said video and an audio code which is obtained by coding said audio, and
such that said video code starts with a sequence header, and such that a first pack has a system header, and
such that said audio code starts with an AAU (Audio Access Unit) header containing information including at least a synchronous work, a bit rate and a sampling frequency.

2. A long-hour video/audio compression device for conducting long-hour recording on a system whose producible file size is limited and for conducting control of compression and coding and recording of videos and audio by the execution of an application program, comprising:
a division unit for dividing an MPEG (Moving Picture Expert Group) code on any bases of an amount of codes, a number of frames, and time designated by said application program, wherein
said division unit divides said MPEG code
such that said MPEG code starts with a pack of a system code obtained by multiplexing a video code which is obtained by coding said video and an audio code which is obtained by coding said audio, and
such that said audio code starts with an AAU (Audio Access Unit) header containing information including at least a synchronous word, a bit rate and a sampling frequency.

3. The long-hour video/audio compression device as set forth in claim 1, wherein
said division unit divides said MPEG code
further, such that a time stamp indicative of a reproduction time of said video code and a time stamp indicative of a reproduction time of said audio code start at values as approximate to each other as possible.

4. The long-hour video/audio compression device as set forth in claim 2, wherein
said division unit divides said MPEG code
further, such that a time stamp indicative of a reproduction time of said video code and a time stamp indicative of a reproduction time of said audio code start at values as approximate to each other as possible.

5. The long-hour video/audio compression device as set forth in claim 1, wherein
said division unit divides said MPEG code
further, such that said audio code starts with an AAU (Audio Access Unit) header containing information including at least a synchronous word, a bit rate and a sampling frequency, and
such that a time stamp indicative of a reproduction time of said video code and a time stamp indicative of a reproduction time of said audio code start at values as approximate to each other as possible.

6. The long-hour video/audio compression device as set forth in claim 1, wherein
said division unit divides said MPEG code
further, such that in said MPEG code, a B picture composed of inter-frame codes in both directions, forward and backward directions, needs not to be referred to over two files.

7. The long-hour video/audio compression device as set forth in claim 2, wherein
said division unit divides said MPEG code
further, such that in said MPEG code, a B picture composed of inter-frame codes in both directions, forward and backward directions, needs not to be referred to over two files.

8. The long-hour video/audio compression device as set forth in claim 2, wherein
said division unit divides said MPEG code
further, such that said video code starts with a sequence header, and such that only a first pack has a system header, and
such that in said MPEG code, a B picture composed of inter-frame codes in both directions, forward and backward directions, needs not to be referred to over two files.

9. The long-hour video/audio compression device as set forth in claim 1, wherein
said division unit divides said MPEG code
further, such that a time stamp indicative of a reproduction time of said video code and a time stamp indicative of a reproduction time of said audio code start at values as approximate to each other as possible, and
such that in said MPEG code, a B picture composed of inter-frame codes in both directions, forward and backward directions, needs not to be referred to over two files.

10. The long-hour video/audio compression device as set forth in claim 2, wherein
said division unit divides said MPEG code
further, such that a time stamp indicative of a reproduction time of said video code and a time stamp indicative of a reproduction time of said audio code start at values as approximate to each other as possible, and
such that in said MPEG code, a B picture composed of inter-frame codes in both directions, forward and backward directions, needs not to be referred to over two files.

11. A long-hour video/audio compression method of conducting long-hour recording on a system whose producible file size is limited and conducting control of compression and coding and recording of videos and audio by the execution of an application program, comprising the step of
dividing an MPEG (Moving Picture Expert Group) code on any bases of an amount of codes, a number of frames, or a time interval, designated by said application program, wherein said MPEG code is divided
such that said MPEG code starts with a pack of a system code obtained by multiplexing a video code which is obtained by coding said video and an audio code which is obtained by coding said audio, and
such that said video code starts with a sequence header, and such that a first pack has a system header, and
such that said audio code starts with an AAU (Audio Access Unit) header containing information including at least a synchronous work, a bit rate and a sampling frequency.

12. A long-hour video/audio compression method of conducting long-hour recording on a system whose producible file size is limited and conducting control of compression and coding and recording of videos and audio by the execution of an application program, comprising the step of
dividing an MPEG (Moving Picture Expert Group) code on any bases of an amount of codes, a number of frames, or a time interval, designated by said application program, wherein said MPEG code is divided such that said MPEG code starts with a pack of a system code obtained by multiplexing a video code which is obtained by coding said video and an audio code which is obtained by coding said audio, and such that said audio code starts with an AAU (Audio Access Unit) header containing information including at least a synchronous word, a bit rate and a sampling frequency.

13. The long-hour video/audio compression method as set forth in claim 11, wherein said MPEG code is divided, and further, such that said audio code starts with an AAU (Audio Access Unit) header containing information including at least a synchronous word, a bit rate and a sampling frequency.

14. The long-hour video/audio compression method as set forth in claim 11, wherein said MPEG code is divided, and further, such that a time stamp indicative of a reproduction time of said video code and a time stamp indicative of a reproduction time of said audio code start at values as approximate to each other as possible.

15. The long-hour video/audio compression method as set forth in claim 12, wherein said MPEG code is divided, and further such that a time stamp indicative of a reproduction time of said video code and a time stamp indicative of a reproduction time of said audio code start at values as approximate to each other as possible.

16. The long-hour video/audio compression method as set forth in claim 11, wherein said MPEG code is divided, and further such that said audio code starts with an AAU (Audio Access Unit) header containing information including at least a synchronous word, a bit rate and a sampling frequency, and such that a time stamp indicative of a reproduction time of said video code and a time stamp indicative of a reproduction time of said audio code start at values as approximate to each other as possible.

17. The long-hour video/audio compression method as set forth in claim 11, wherein said MPEG code is divided, and further, such that in said MPEG code, a B picture composed of inter-frame codes in both directions, forward and backward directions, needs not to be referred to over two files.

18. The long-hour video/audio compression method as set forth in claim 12, wherein said MPEG code is divided, and further, such that in said MPEG code, a B picture composed of inter-frame codes in both directions, forward and backward directions, needs-not to be referred to over two files.

19. The long-hour video/audio compression method as set forth in claim 12, wherein said MPEG code is divided, and further such that said video code starts with a sequence header, and such that a first pack has a system header, and such that in said MPEG code, a B picture composed of inter-frame codes in both directions, forward and backward directions, needs not to be referred to over two files.

20. The long-hour video/audio compression method as set forth in claim 11, wherein said MPEG code is divided, and further, such that a time stamp indicative of a reproduction time of said video code and a time stamp indicative of a reproduction time of said audio code start at values as approximate to each other as possible, and such that in said MPEG code, a B picture composed of inter-frame codes in both directions, forward and backward directions, needs not to be referred to over two files.

21. The long-hour video/audio compression method as set forth in claim 2, wherein said MPEG code is divided, such that a time stamp indicative of a reproduction time of said video code and a time stamp indicative of a reproduction time of said audio code start at values as approximate to each other as possible, and further, such that in said MPEG code, a B picture composed of inter-frame codes in both directions, forward and backward directions, needs not to be referred to over two files.

22. A long-hour video/audio compression program for conducting long-hour recording on a system whose producible file size is limited and for conducting control of compression and coding and recording of videos and audio by the execution of an application program by controlling a computer, comprising the function of dividing an MPEG (Moving Picture Expert Group) code on any of bases of an amount of codes, a number of frames, or time designated by said application program, further comprising the function of dividing said MPEG code, such that said MPEG code starts with a pack of a system code obtained by multiplexing a video code which is obtained by coding said video and an audio code which is obtained by coding said audio, and such that said video code starts with a sequence header, and such that a first pack has a system header, and further, such that said audio code starts with an AAU (Audio Access Unit) header containing information including at least a synchronous work, a bit rate and a sampling frequency.

23. A long-hour video/audio compression program for conducting long-hour recording on a system whose producible file size is limited and for conducting control of compression and coding and recording of videos and audio by the execution of an application program by controlling a computer, comprising the function of dividing an MPEG (Moving Picture Expert Group) code on any of bases of an amount of codes, a number of frames, or time designated by said application program, further comprising the function of dividing said MPEG codes, such that said MPEG code starts with a pack of a system code obtained by multiplexing a video code which is obtained by coding said video and an audio code which is obtained by coding said audio, and such that said audio code starts with an AAU (Audio Access Unit) header containing information including at least a synchronous word, a bit rate and a sampling frequency.

24. The long-hour video/audio compression program as set forth in claim 22, comprising the function of dividing said MPEG code, and further such that said audio code starts with an AAU (Audio Access Unit) header containing information including at least a synchronous word, a bit rate and a sampling frequency.

25. A long hour video/audio compression device for conducting long-hour recording on a system whose producible file size is limited and for conducting control of compression, coding, and recording of video and audio by the execution of an application program, comprising:
a division unit for dividing an MPEG (Moving Picture Expert Group) code on any of the bases of an amount of codes, a number of frames, and time designated by said application program, wherein
said division unit divides said MPEG code,
such that said MPEG code starts with a pack of a system code obtained by multiplexing a video code which is obtained by coding said video and an audio code which is obtained by coding said audio,
further such that a time stamp indicative of a reproduction time of said video code and a time stamp indicative of a reproduction time of said audio code start at values as approximate to each other as possible by outputting video data of a time period whose value is as approximate to a time stamp difference between the time stamp of said video code and the time stamp of the audio code when the time stamp difference is not less than the time of one frame and the time stamp of said video code is less than the time stamp of the audio code and by outputting audio data of a time period whose value is as approximate to the time stamp difference between the time stamp of said video code and the time stamp of the audio code when the time stamp difference is not less than the time of one frame and the time stamp of said video code is not less than the time stamp of the audio code.

* * * * *